United States Patent
Munoz et al.

(10) Patent No.: US 10,360,290 B2
(45) Date of Patent: Jul. 23, 2019

(54) REMOTE CREATION OF A PLAYBACK QUEUE FOR A FUTURE EVENT

(71) Applicant: Sonos, Inc., Santa Barbara, CA (US)

(72) Inventors: Jaime Munoz, Seattle, WA (US); Jonathan D. Garn, Seattle, WA (US); Michael Lemmon, Seattle, WA (US); Dave Taylor, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 15/692,090

(22) Filed: Aug. 31, 2017

(65) Prior Publication Data
US 2018/0004714 A1   Jan. 4, 2018

Related U.S. Application Data

(63) Continuation of application No. 14/173,253, filed on Feb. 5, 2014, now abandoned.

(51) Int. Cl.
*G06F 17/22* (2006.01)
*G06F 17/24* (2006.01)
(Continued)

(52) U.S. Cl.
CPC ........ *G06F 17/2235* (2013.01); *G06F 16/639* (2019.01); *G06F 17/241* (2013.01);
(Continued)

(58) Field of Classification Search
CPC .............. G06F 17/2235; G06F 17/241; G06F 17/30772; H04N 21/26258; H04N 21/2668; H04N 21/4825
See application file for complete search history.

(56) References Cited

U.S. PATENT DOCUMENTS

| 4,296,278 A | 10/1981 | Cullison et al. |
| 4,816,989 A | 3/1989 | Finn et al. |

(Continued)

FOREIGN PATENT DOCUMENTS

| CN | 101410773 A | 4/2009 |
| EP | 0251584 A2 | 1/1988 |

(Continued)

OTHER PUBLICATIONS

First Action Interview Pilot Program Pre-Interview Communication dated Oct. 28, 2015, issued in connection with U.S. Appl. No. 14/275,112, filed May 12, 2014, 4 pages.

(Continued)

*Primary Examiner* — Stephen S Hong
*Assistant Examiner* — Hope C Sheffield
(74) *Attorney, Agent, or Firm* — McDonnell Boehnen Hulbert & Berghoff LLP

(57) ABSTRACT

Example embodiments involve remote creation of a playback queue for an event. An example implementation involves a cloud computing system receiving, from a first mobile device, one or more messages representing an instruction to create a playlist for an event. In response, the system creates the playlist in data storage. The system sends, to multiple second mobile devices, one or more respective invitations to the event, wherein each invitation indicates: a time and date for the event and a link to a web interface including controls to add audio tracks to the playlist for the event. The system receives respective sets of input data, each set indicating audio tracks selected via the web interface on a respective second mobile device and, in response, adds the respective audio tracks to the playlist. During the event, the system causes the playlist to be queued in a queue of a media playback system.

20 Claims, 14 Drawing Sheets

(51) Int. Cl.
  *G06F 16/638* (2019.01)
  *H04N 21/262* (2011.01)
  *H04N 21/2668* (2011.01)
  *H04N 21/482* (2011.01)

(52) U.S. Cl.
  CPC ... *H04N 21/2668* (2013.01); *H04N 21/26258* (2013.01); *H04N 21/4825* (2013.01)

(56) References Cited

U.S. PATENT DOCUMENTS

| | | |
|---|---|---|
| 5,182,552 A | 1/1993 | Paynting |
| 5,239,458 A | 8/1993 | Suzuki |
| 5,299,266 A | 3/1994 | Lumsden |
| 5,406,634 A | 4/1995 | Anderson et al. |
| 5,440,644 A | 8/1995 | Farinelli et al. |
| 5,467,342 A | 11/1995 | Logston et al. |
| 5,491,839 A | 2/1996 | Schotz |
| 5,553,222 A | 9/1996 | Milne et al. |
| 5,563,946 A | 10/1996 | Cooper et al. |
| 5,668,884 A | 9/1997 | Clair, Jr. et al. |
| 5,673,323 A | 9/1997 | Schotz et al. |
| 5,751,819 A | 5/1998 | Dorrough |
| 5,761,320 A | 6/1998 | Farinelli et al. |
| 5,774,666 A | 6/1998 | Portuesi |
| 5,808,662 A | 9/1998 | Kinney et al. |
| 5,815,689 A | 9/1998 | Shaw et al. |
| 5,856,827 A | 1/1999 | Sudo |
| 5,867,691 A | 2/1999 | Shiraishi |
| 5,875,354 A | 2/1999 | Charlton et al. |
| 5,887,143 A | 3/1999 | Saito et al. |
| 5,923,902 A | 7/1999 | Inagaki |
| 5,946,343 A | 8/1999 | Schotz et al. |
| 5,956,088 A | 9/1999 | Shen et al. |
| 6,002,862 A | 12/1999 | Takaike |
| 6,009,457 A | 12/1999 | Moller |
| 6,026,150 A | 2/2000 | Frank et al. |
| 6,031,818 A | 2/2000 | Lo et al. |
| 6,032,202 A | 2/2000 | Lea et al. |
| 6,108,686 A | 8/2000 | Williams, Jr. |
| 6,128,318 A | 10/2000 | Sato |
| 6,157,957 A | 12/2000 | Berthaud |
| 6,175,872 B1 | 1/2001 | Neumann et al. |
| 6,181,316 B1 | 1/2001 | Little et al. |
| 6,185,737 B1 | 2/2001 | Northcutt et al. |
| 6,195,436 B1 | 2/2001 | Scibora et al. |
| 6,199,169 B1 | 3/2001 | Voth |
| 6,255,961 B1 | 7/2001 | Van Ryzin et al. |
| 6,256,554 B1 | 7/2001 | DiLorenzo |
| 6,308,207 B1 | 10/2001 | Tseng et al. |
| 6,324,586 B1 | 11/2001 | Johnson |
| 6,332,147 B1 | 12/2001 | Moran et al. |
| 6,349,339 B1 | 2/2002 | Williams |
| 6,351,821 B1 | 2/2002 | Voth |
| 6,404,811 B1 | 6/2002 | Cvetko et al. |
| 6,430,353 B1 | 8/2002 | Honda et al. |
| 6,469,633 B1 | 10/2002 | Wachter |
| 6,487,296 B1 | 11/2002 | Allen et al. |
| 6,522,886 B1 | 2/2003 | Youngs et al. |
| 6,526,325 B1 | 2/2003 | Sussman et al. |
| 6,587,127 B1 | 7/2003 | Leeke et al. |
| 6,594,691 B1 | 7/2003 | McCollum et al. |
| 6,598,172 B1 | 7/2003 | Vandeusen et al. |
| 6,611,537 B1 | 8/2003 | Edens et al. |
| 6,631,410 B1 | 10/2003 | Kowalski et al. |
| 6,674,803 B1 | 1/2004 | Kesselring |
| 6,728,531 B1 | 4/2004 | Lee et al. |
| 6,732,155 B2 | 5/2004 | Meek |
| 6,757,517 B2 | 6/2004 | Chang |
| 6,778,869 B2 | 8/2004 | Champion |
| 6,826,283 B1 | 11/2004 | Wheeler et al. |
| 6,836,788 B2 | 12/2004 | Kim et al. |
| 6,898,642 B2 | 5/2005 | Chafle et al. |
| 6,912,610 B2 | 6/2005 | Spencer |
| 6,920,373 B2 | 7/2005 | Xi et al. |
| 6,934,766 B1 | 8/2005 | Russell |
| 6,985,694 B1 | 1/2006 | De Bonet et al. |
| 7,007,106 B1 | 2/2006 | Flood et al. |
| 7,017,118 B1 | 3/2006 | Carroll |
| 7,020,048 B2 | 3/2006 | McComas |
| 7,020,791 B1 | 3/2006 | Aweya et al. |
| 7,043,651 B2 | 5/2006 | Aweya et al. |
| 7,047,308 B2 | 5/2006 | Deshpande |
| 7,113,833 B1 | 9/2006 | Brown et al. |
| 7,113,999 B2 | 9/2006 | Pestoni et al. |
| 7,115,017 B1 | 10/2006 | Laursen et al. |
| 7,117,451 B2 | 10/2006 | Sielken |
| 7,124,125 B2 | 10/2006 | Cook et al. |
| 7,130,608 B2 | 10/2006 | Hollstrom et al. |
| 7,130,616 B2 | 10/2006 | Janik |
| 7,143,141 B1 | 11/2006 | Morgan et al. |
| 7,143,939 B2 | 12/2006 | Henzerling |
| 7,162,315 B2 | 1/2007 | Gilbert |
| 7,185,090 B2 | 2/2007 | Kowalski et al. |
| 7,187,947 B1 | 3/2007 | White et al. |
| 7,206,367 B1 | 4/2007 | Moore |
| 7,209,795 B2 | 4/2007 | Sullivan et al. |
| 7,218,708 B2 | 5/2007 | Berezowski et al. |
| 7,236,739 B2 | 6/2007 | Chang |
| 7,236,773 B2 | 6/2007 | Thomas |
| 7,281,034 B1 | 10/2007 | Eyal |
| 7,293,060 B2 | 11/2007 | Komsi |
| 7,295,548 B2 | 11/2007 | Blank et al. |
| 7,302,468 B2 | 11/2007 | Wijeratne |
| 7,312,785 B2 | 12/2007 | Tsuk et al. |
| 7,324,857 B2 | 1/2008 | Goddard |
| 7,333,519 B2 | 2/2008 | Sullivan et al. |
| 7,358,960 B2 | 4/2008 | Mak |
| 7,372,846 B2 | 5/2008 | Zwack |
| 7,391,791 B2 | 6/2008 | Balassanian et al. |
| 7,392,102 B2 | 6/2008 | Sullivan et al. |
| 7,483,538 B2 | 1/2009 | McCarty et al. |
| 7,483,958 B1 | 1/2009 | Elabbady et al. |
| 7,496,623 B2 | 2/2009 | Szeto et al. |
| 7,496,633 B2 | 2/2009 | Szeto et al. |
| 7,571,014 B1 | 8/2009 | Lambourne et al. |
| 7,574,274 B2 | 8/2009 | Holmes |
| 7,599,685 B2 | 10/2009 | Goldberg et al. |
| 7,630,501 B2 | 12/2009 | Blank et al. |
| 7,643,894 B2 | 1/2010 | Braithwaite et al. |
| 7,657,224 B2 | 2/2010 | Goldberg et al. |
| 7,657,644 B1 | 2/2010 | Zheng |
| 7,657,910 B1 | 2/2010 | McAulay et al. |
| 7,668,990 B2 | 2/2010 | Krzyzanowski et al. |
| 7,669,219 B2 | 2/2010 | Scott, III |
| 7,675,943 B2 | 3/2010 | Mosig et al. |
| 7,676,142 B1 | 3/2010 | Hung |
| 7,702,279 B2 | 4/2010 | Ko et al. |
| 7,720,096 B2 | 5/2010 | Klemets |
| 7,725,533 B2 | 5/2010 | Szeto et al. |
| 7,725,551 B2 | 5/2010 | Szeto et al. |
| 7,739,271 B2 | 6/2010 | Cook et al. |
| 7,742,740 B2 | 6/2010 | Goldberg et al. |
| 7,788,138 B2 | 8/2010 | Viehmann et al. |
| 7,805,682 B1 | 9/2010 | Lambourne |
| 7,835,689 B2 | 11/2010 | Goldberg et al. |
| 7,853,341 B2 | 12/2010 | McCarty et al. |
| 7,865,137 B2 | 1/2011 | Goldberg et al. |
| 7,885,622 B2 | 2/2011 | Krampf et al. |
| 7,916,877 B2 | 3/2011 | Goldberg et al. |
| 7,917,082 B2 | 3/2011 | Goldberg et al. |
| 7,921,369 B2 | 4/2011 | Bill |
| 7,934,239 B1 | 4/2011 | Dagman |
| 7,987,294 B2 | 7/2011 | Bryce et al. |
| 7,996,566 B1 | 8/2011 | Sylvain et al. |
| 8,014,423 B2 | 9/2011 | Thaler et al. |
| 8,023,663 B2 | 9/2011 | Goldberg |
| 8,028,038 B2 | 9/2011 | Weel |
| 8,028,323 B2 | 9/2011 | Weel |
| 8,045,952 B2 | 10/2011 | Qureshey et al. |
| 8,050,652 B2 | 11/2011 | Qureshey et al. |
| 8,074,253 B1 | 12/2011 | Nathan |
| 8,086,752 B2 | 12/2011 | Millington et al. |
| 8,103,009 B2 | 1/2012 | McCarty et al. |

(56) References Cited

U.S. PATENT DOCUMENTS

| | | |
|---|---|---|
| 8,112,032 B2 | 2/2012 | Ko et al. |
| 8,131,390 B2 | 3/2012 | Braithwaite et al. |
| 8,169,938 B2 | 5/2012 | Duchscher et al. |
| 8,200,602 B2 | 6/2012 | Farrelly |
| 8,214,873 B2 | 7/2012 | Weel |
| 8,230,099 B2 | 7/2012 | Weel |
| 8,234,395 B2 | 7/2012 | Millington et al. |
| 8,271,115 B2 | 9/2012 | Yoshida |
| 8,290,603 B1 | 10/2012 | Lambourne |
| 8,315,555 B2 | 11/2012 | Ko et al. |
| 8,370,678 B2 | 2/2013 | Millington et al. |
| 8,423,659 B2 | 4/2013 | Millington |
| 8,483,853 B1 | 7/2013 | Lambourne |
| 8,521,316 B2 | 8/2013 | Louboutin |
| 8,588,949 B2 | 11/2013 | Lambourne et al. |
| 8,613,385 B1 | 12/2013 | Hulet et al. |
| 8,666,826 B2 | 3/2014 | Narayanan et al. |
| 8,775,546 B2 | 7/2014 | Millington |
| 8,843,500 B2 | 9/2014 | Nogues et al. |
| 8,892,648 B1 | 11/2014 | Durham et al. |
| 8,910,265 B2 | 12/2014 | Lang et al. |
| 8,942,252 B2 | 1/2015 | Balassanian et al. |
| 8,990,701 B2 | 3/2015 | Olofsson |
| 9,052,810 B2 | 6/2015 | Reimann et al. |
| 9,137,564 B2 | 9/2015 | Reimann |
| 9,165,255 B1 | 10/2015 | Shetty et al. |
| 9,229,938 B1 * | 1/2016 | Jaini .................. G06F 16/4393 |
| 9,246,866 B1 | 1/2016 | Sanders |
| 9,247,363 B2 | 1/2016 | Triplett et al. |
| 9,286,384 B2 | 3/2016 | Kuper et al. |
| 9,344,292 B2 | 5/2016 | Griffiths et al. |
| 9,374,607 B2 | 6/2016 | Bates et al. |
| 9,478,247 B2 | 10/2016 | Chen et al. |
| 9,489,383 B2 | 11/2016 | Hyman et al. |
| 9,510,055 B2 | 11/2016 | Kuper et al. |
| 9,524,338 B2 | 12/2016 | Van Der Heide et al. |
| 9,696,874 B2 | 7/2017 | Kulick et al. |
| 9,715,500 B2 | 7/2017 | Cue et al. |
| 9,756,092 B2 | 9/2017 | Zhang et al. |
| 2001/0009604 A1 | 7/2001 | Ando et al. |
| 2001/0022823 A1 | 9/2001 | Renaud |
| 2001/0032188 A1 | 10/2001 | Miyabe et al. |
| 2001/0042107 A1 | 11/2001 | Palm |
| 2002/0002039 A1 | 1/2002 | Qureshey et al. |
| 2002/0002562 A1 | 1/2002 | Moran et al. |
| 2002/0003548 A1 | 1/2002 | Krusche et al. |
| 2002/0022453 A1 | 2/2002 | Balog et al. |
| 2002/0026442 A1 | 2/2002 | Lipscomb et al. |
| 2002/0034374 A1 | 3/2002 | Barton |
| 2002/0042844 A1 | 4/2002 | Chiazzese |
| 2002/0049843 A1 | 4/2002 | Barone et al. |
| 2002/0054134 A1 | 5/2002 | Kelts |
| 2002/0056117 A1 | 5/2002 | Hasegawa et al. |
| 2002/0065926 A1 | 5/2002 | Hackney et al. |
| 2002/0072816 A1 | 6/2002 | Shdema et al. |
| 2002/0073228 A1 | 6/2002 | Cognet et al. |
| 2002/0090914 A1 | 7/2002 | Kang et al. |
| 2002/0093478 A1 | 7/2002 | Yeh |
| 2002/0109710 A1 | 8/2002 | Holtz et al. |
| 2002/0112244 A1 | 8/2002 | Liou et al. |
| 2002/0116476 A1 | 8/2002 | Eyal et al. |
| 2002/0124097 A1 | 9/2002 | Isely et al. |
| 2002/0129156 A1 | 9/2002 | Yoshikawa |
| 2002/0143998 A1 | 10/2002 | Rajagopal et al. |
| 2002/0163361 A1 | 11/2002 | Parkin |
| 2002/0165921 A1 | 11/2002 | Sapieyevski |
| 2002/0178191 A1 | 11/2002 | Sielken |
| 2002/0188762 A1 | 12/2002 | Tomassetti et al. |
| 2003/0002609 A1 | 1/2003 | Faller et al. |
| 2003/0020763 A1 | 1/2003 | Mayer et al. |
| 2003/0023741 A1 | 1/2003 | Tomassetti et al. |
| 2003/0035444 A1 | 2/2003 | Zwack |
| 2003/0041173 A1 | 2/2003 | Hoyle |
| 2003/0041174 A1 | 2/2003 | Wen et al. |
| 2003/0043924 A1 | 3/2003 | Haddad et al. |
| 2003/0066094 A1 | 4/2003 | Van Der Schaar et al. |
| 2003/0099212 A1 | 5/2003 | Anjum et al. |
| 2003/0099221 A1 | 5/2003 | Rhee |
| 2003/0105820 A1 * | 6/2003 | Haims ................. G06Q 10/10 709/205 |
| 2003/0126211 A1 | 7/2003 | Anttila et al. |
| 2003/0157951 A1 | 8/2003 | Hasty |
| 2003/0195964 A1 | 10/2003 | Mane |
| 2003/0198257 A1 | 10/2003 | Sullivan et al. |
| 2003/0210796 A1 | 11/2003 | McCarty et al. |
| 2003/0220973 A1 | 11/2003 | Zhu et al. |
| 2003/0231871 A1 | 12/2003 | Ushimaru |
| 2003/0235304 A1 | 12/2003 | Evans et al. |
| 2004/0001484 A1 | 1/2004 | Ozguner |
| 2004/0001591 A1 | 1/2004 | Mani et al. |
| 2004/0008852 A1 | 1/2004 | Also et al. |
| 2004/0010727 A1 | 1/2004 | Fujinami |
| 2004/0015252 A1 | 1/2004 | Aiso et al. |
| 2004/0024478 A1 | 2/2004 | Hans et al. |
| 2004/0024925 A1 | 2/2004 | Cypher et al. |
| 2004/0025185 A1 | 2/2004 | Goci et al. |
| 2004/0027166 A1 | 2/2004 | Mangum et al. |
| 2004/0032348 A1 | 2/2004 | Lai et al. |
| 2004/0066736 A1 | 4/2004 | Kroeger |
| 2004/0075767 A1 | 4/2004 | Neuman et al. |
| 2004/0078383 A1 | 4/2004 | Mercer et al. |
| 2004/0078812 A1 | 4/2004 | Calvert |
| 2004/0088328 A1 | 5/2004 | Cook et al. |
| 2004/0131192 A1 | 7/2004 | Metcalf |
| 2004/0170383 A1 | 9/2004 | Mazur |
| 2004/0203378 A1 | 10/2004 | Powers |
| 2004/0215611 A1 | 10/2004 | Jawa et al. |
| 2004/0249965 A1 | 12/2004 | Huggins et al. |
| 2004/0249982 A1 | 12/2004 | Arnold et al. |
| 2004/0252400 A1 | 12/2004 | Blank et al. |
| 2004/0261040 A1 | 12/2004 | Radcliffe et al. |
| 2005/0010691 A1 | 1/2005 | Oyadomari et al. |
| 2005/0013394 A1 | 1/2005 | Rausch et al. |
| 2005/0021590 A1 | 1/2005 | Debique et al. |
| 2005/0047605 A1 | 3/2005 | Lee et al. |
| 2005/0058149 A1 | 3/2005 | Howe |
| 2005/0081213 A1 | 4/2005 | Suzuoki et al. |
| 2005/0108320 A1 | 5/2005 | Lord et al. |
| 2005/0114538 A1 | 5/2005 | Rose |
| 2005/0125357 A1 | 6/2005 | Saadat et al. |
| 2005/0166157 A1 | 7/2005 | Ollis et al. |
| 2005/0177643 A1 | 8/2005 | Xu |
| 2005/0181348 A1 | 8/2005 | Carey et al. |
| 2005/0195205 A1 | 9/2005 | Abrams |
| 2005/0201254 A1 | 9/2005 | Looney et al. |
| 2005/0234875 A1 | 10/2005 | Auerbach et al. |
| 2005/0281255 A1 | 12/2005 | Davies et al. |
| 2005/0283820 A1 | 12/2005 | Richards et al. |
| 2005/0288805 A1 | 12/2005 | Moore et al. |
| 2005/0289224 A1 | 12/2005 | Deslippe et al. |
| 2006/0095516 A1 | 5/2006 | Wijeratne |
| 2006/0107237 A1 | 5/2006 | Kim |
| 2006/0119497 A1 | 6/2006 | Miller et al. |
| 2006/0143236 A1 | 6/2006 | Wu |
| 2006/0168340 A1 | 7/2006 | Heller et al. |
| 2006/0195462 A1 | 8/2006 | Rogers |
| 2006/0195479 A1 | 8/2006 | Spiegelman et al. |
| 2006/0195480 A1 | 8/2006 | Spiegelman et al. |
| 2006/0253436 A1 | 11/2006 | Cook et al. |
| 2006/0253782 A1 | 11/2006 | Stark et al. |
| 2006/0294074 A1 | 12/2006 | Chang |
| 2007/0033402 A1 | 2/2007 | Williams et al. |
| 2007/0038999 A1 | 2/2007 | Millington et al. |
| 2007/0043847 A1 | 2/2007 | Carter et al. |
| 2007/0048713 A1 | 3/2007 | Plastina et al. |
| 2007/0054680 A1 | 3/2007 | Mo et al. |
| 2007/0088747 A1 | 4/2007 | Cheng et al. |
| 2007/0136778 A1 | 6/2007 | Birger et al. |
| 2007/0142022 A1 | 6/2007 | Madonna et al. |
| 2007/0142944 A1 | 6/2007 | Goldberg et al. |
| 2007/0143493 A1 | 6/2007 | Mullig et al. |
| 2007/0169115 A1 | 7/2007 | Ko et al. |
| 2007/0180137 A1 | 8/2007 | Rajapakse |
| 2007/0214182 A1 | 9/2007 | Rosenberg |

(56) References Cited

U.S. PATENT DOCUMENTS

| | | |
|---|---|---|
| 2007/0224937 A1 | 9/2007 | Jung et al. |
| 2007/0271232 A1 | 11/2007 | Mattox et al. |
| 2007/0271388 A1 | 11/2007 | Bowra et al. |
| 2007/0288470 A1 | 12/2007 | Kauniskangas et al. |
| 2007/0294131 A1 | 12/2007 | Roman et al. |
| 2007/0299778 A1 | 12/2007 | Haveson et al. |
| 2008/0005690 A1 | 1/2008 | Van Vugt |
| 2008/0016465 A1 | 1/2008 | Foxenland |
| 2008/0022320 A1 | 1/2008 | Ver Steeg |
| 2008/0052371 A1 | 2/2008 | Partovi et al. |
| 2008/0059510 A1 | 3/2008 | Cardamore et al. |
| 2008/0077261 A1 | 3/2008 | Baudino et al. |
| 2008/0086368 A1 | 4/2008 | Bauman et al. |
| 2008/0091771 A1 | 4/2008 | Allen et al. |
| 2008/0109529 A1 | 5/2008 | Story |
| 2008/0120429 A1 | 5/2008 | Millington et al. |
| 2008/0144861 A1 | 6/2008 | Melanson et al. |
| 2008/0152165 A1 | 6/2008 | Zacchi |
| 2008/0154959 A1 | 6/2008 | Dunko |
| 2008/0194276 A1 | 8/2008 | Lin et al. |
| 2008/0301280 A1 | 12/2008 | Chasen et al. |
| 2008/0319833 A1 | 12/2008 | Svendsen |
| 2009/0031336 A1 | 1/2009 | Chavez et al. |
| 2009/0041423 A1 | 2/2009 | Weber et al. |
| 2009/0063414 A1 | 3/2009 | White et al. |
| 2009/0076881 A1 | 3/2009 | Svendsen |
| 2009/0076917 A1 | 3/2009 | Jablokov et al. |
| 2009/0150806 A1 | 6/2009 | Evje et al. |
| 2009/0157905 A1 | 6/2009 | Davis |
| 2009/0179867 A1 | 7/2009 | Shim et al. |
| 2009/0222115 A1 | 9/2009 | Malcolm et al. |
| 2009/0228919 A1 | 9/2009 | Zott et al. |
| 2009/0249222 A1* | 10/2009 | Schmidt ............ H04N 21/2368 715/751 |
| 2009/0265426 A1 | 10/2009 | Svendsen et al. |
| 2009/0307062 A1 | 12/2009 | Lutnick et al. |
| 2009/0313369 A1 | 12/2009 | Wormington et al. |
| 2010/0010648 A1 | 1/2010 | Bull et al. |
| 2010/0017366 A1 | 1/2010 | Robertson et al. |
| 2010/0017714 A1 | 1/2010 | Agarwal et al. |
| 2010/0031366 A1 | 2/2010 | Knight et al. |
| 2010/0036950 A1 | 2/2010 | Bae et al. |
| 2010/0049835 A1 | 2/2010 | Ko et al. |
| 2010/0054275 A1 | 3/2010 | Noonan et al. |
| 2010/0082731 A1 | 4/2010 | Haughay et al. |
| 2010/0094834 A1 | 4/2010 | Svendsen |
| 2010/0095332 A1 | 4/2010 | Gran et al. |
| 2010/0131567 A1 | 5/2010 | Dorogusker et al. |
| 2010/0205222 A1 | 8/2010 | Gajdos et al. |
| 2010/0228740 A1 | 9/2010 | Cannistraro et al. |
| 2010/0262909 A1 | 10/2010 | Hsieh |
| 2010/0284389 A1* | 11/2010 | Ramsay ............ H04N 21/42684 370/338 |
| 2010/0299391 A1* | 11/2010 | Demarta ................ G06F 15/16 709/205 |
| 2010/0299639 A1 | 11/2010 | Ramsay et al. |
| 2010/0318917 A1 | 12/2010 | Holladay et al. |
| 2011/0004330 A1 | 1/2011 | Rothkopf et al. |
| 2011/0066943 A1 | 3/2011 | Brillon et al. |
| 2011/0087842 A1 | 4/2011 | Lu et al. |
| 2011/0119706 A1 | 5/2011 | Scott et al. |
| 2011/0154173 A1 | 6/2011 | Herlein |
| 2011/0196888 A1 | 8/2011 | Hanson et al. |
| 2011/0202430 A1 | 8/2011 | Narayanan et al. |
| 2011/0202842 A1 | 8/2011 | Weatherly et al. |
| 2011/0211534 A1 | 9/2011 | Schmidt et al. |
| 2011/0225417 A1 | 9/2011 | Maharajh et al. |
| 2011/0238755 A1 | 9/2011 | Khan et al. |
| 2011/0246383 A1 | 10/2011 | Gibson et al. |
| 2011/0264732 A1 | 10/2011 | Robbin et al. |
| 2011/0314388 A1 | 12/2011 | Wheatley |
| 2012/0029671 A1 | 2/2012 | Millington et al. |
| 2012/0030366 A1 | 2/2012 | Collart et al. |
| 2012/0054278 A1 | 3/2012 | Taleb et al. |
| 2012/0060046 A1 | 3/2012 | Millington |
| 2012/0071996 A1 | 3/2012 | Svendsen |
| 2012/0096526 A1 | 4/2012 | Brahmanapalli et al. |
| 2012/0117168 A1 | 5/2012 | Sugiyama et al. |
| 2012/0117185 A1 | 5/2012 | Cassidy |
| 2012/0117586 A1 | 5/2012 | McCoy et al. |
| 2012/0129446 A1 | 5/2012 | Ko et al. |
| 2012/0151320 A1 | 6/2012 | McClements, IV |
| 2012/0158531 A1 | 6/2012 | Dion et al. |
| 2012/0159393 A1 | 6/2012 | Sethi et al. |
| 2012/0206623 A1 | 8/2012 | Nakama |
| 2012/0210205 A1 | 8/2012 | Sherwood et al. |
| 2012/0221951 A1 | 8/2012 | Kidron |
| 2012/0233067 A1 | 9/2012 | Matthew et al. |
| 2012/0233639 A1 | 9/2012 | Zott et al. |
| 2012/0272156 A1 | 10/2012 | Kerger et al. |
| 2012/0284423 A1 | 11/2012 | Weel |
| 2012/0311635 A1 | 12/2012 | Mushkatblat |
| 2012/0315884 A1 | 12/2012 | Forutanpour et al. |
| 2012/0331386 A1* | 12/2012 | Hicken ............ G06F 17/30743 715/716 |
| 2013/0007617 A1 | 1/2013 | MacKenzie et al. |
| 2013/0024880 A1 | 1/2013 | Moloney-Egnatios et al. |
| 2013/0031162 A1 | 1/2013 | Willis et al. |
| 2013/0061296 A1 | 3/2013 | Reddy et al. |
| 2013/0070093 A1 | 3/2013 | Rivera et al. |
| 2013/0073584 A1 | 3/2013 | Kuper et al. |
| 2013/0080599 A1 | 3/2013 | Ko et al. |
| 2013/0080955 A1 | 3/2013 | Reimann et al. |
| 2013/0094670 A1 | 4/2013 | Millington |
| 2013/0128038 A1 | 5/2013 | Cok et al. |
| 2013/0129232 A1 | 5/2013 | Cok et al. |
| 2013/0130729 A1 | 5/2013 | Cok et al. |
| 2013/0159858 A1 | 6/2013 | Joffray et al. |
| 2013/0173034 A1 | 7/2013 | Reimann et al. |
| 2013/0174204 A1 | 7/2013 | Coburn, IV et al. |
| 2013/0191454 A1* | 7/2013 | Oliver ................ G06F 16/639 709/204 |
| 2013/0191749 A1 | 7/2013 | Coburn, IV et al. |
| 2013/0198633 A1 | 8/2013 | Hyman |
| 2013/0246522 A1 | 9/2013 | Bilinski et al. |
| 2013/0246916 A1 | 9/2013 | Reimann et al. |
| 2013/0254207 A1 | 9/2013 | Coburn, IV et al. |
| 2013/0254663 A1 | 9/2013 | Bates et al. |
| 2013/0310316 A1 | 11/2013 | Hellstrom et al. |
| 2013/0339397 A1 | 12/2013 | Herasymchuk |
| 2013/0343567 A1 | 12/2013 | Triplett et al. |
| 2013/0346859 A1 | 12/2013 | Bates et al. |
| 2014/0047074 A1 | 2/2014 | Chung et al. |
| 2014/0052770 A1 | 2/2014 | Gran et al. |
| 2014/0075308 A1 | 3/2014 | Sanders et al. |
| 2014/0075316 A1 | 3/2014 | Li |
| 2014/0081796 A1 | 3/2014 | Cohen |
| 2014/0093219 A1 | 4/2014 | Trivedi |
| 2014/0115061 A1 | 4/2014 | Reddy et al. |
| 2014/0122590 A1 | 5/2014 | Svendsen |
| 2014/0181655 A1 | 6/2014 | Kumar et al. |
| 2014/0201197 A1 | 7/2014 | Kumar et al. |
| 2014/0204076 A1 | 7/2014 | Kuper et al. |
| 2014/0208205 A1 | 7/2014 | Bartholomew |
| 2014/0223099 A1 | 8/2014 | Kidron |
| 2014/0237361 A1 | 8/2014 | Martin et al. |
| 2014/0244863 A1 | 8/2014 | Bradley et al. |
| 2014/0310058 A1 | 10/2014 | Aral et al. |
| 2014/0310779 A1 | 10/2014 | Lof et al. |
| 2014/0330951 A1 | 11/2014 | Sukoff et al. |
| 2014/0337959 A1 | 11/2014 | Garmark et al. |
| 2014/0341528 A1 | 11/2014 | Mahate et al. |
| 2015/0046458 A1 | 2/2015 | Hu |
| 2015/0067054 A1 | 3/2015 | Yoo et al. |
| 2015/0067871 A1 | 3/2015 | Commons et al. |
| 2015/0074534 A1 | 3/2015 | Didomenico et al. |
| 2015/0095170 A1 | 4/2015 | Lang et al. |
| 2015/0095680 A1 | 4/2015 | Gossain et al. |
| 2015/0128162 A1 | 5/2015 | Ionescu et al. |
| 2015/0185599 A1 | 7/2015 | Mullins |
| 2015/0186110 A1 | 7/2015 | Kannan |
| 2015/0220498 A1 | 8/2015 | Munoz et al. |
| 2015/0286360 A1 | 10/2015 | Wachter et al. |
| 2015/0310009 A1 | 10/2015 | Van Der Heide |

(56) References Cited

U.S. PATENT DOCUMENTS

| | | |
|---|---|---|
| 2015/0312299 A1 | 10/2015 | Chen |
| 2016/0063011 A1 | 3/2016 | Wehbi et al. |
| 2016/0082348 A1 | 3/2016 | Kehoe et al. |
| 2016/0180248 A1 | 6/2016 | Regan |
| 2017/0169522 A1 | 6/2017 | Hyman et al. |

FOREIGN PATENT DOCUMENTS

| | | |
|---|---|---|
| EP | 0672985 A1 | 9/1995 |
| EP | 1111527 A2 | 6/2001 |
| EP | 1389853 A1 | 2/2004 |
| JP | 2007520808 A | 7/2007 |
| JP | 2009540638 A | 11/2009 |
| JP | 2011128957 | 6/2011 |
| JP | 2011223124 A | 11/2011 |
| KR | 20010090215 | 10/2001 |
| KR | 20050051785 | 6/2005 |
| KR | 1020070040592 | 4/2007 |
| KR | 20070048922 | 5/2007 |
| KR | 100890993 | 3/2009 |
| KR | 20100060498 A | 6/2010 |
| KR | 20100071724 | 6/2010 |
| KR | 20100134164 | 12/2010 |
| KR | 20110064635 | 6/2011 |
| KR | 20130083012 A | 7/2013 |
| WO | 199525313 | 9/1995 |
| WO | 199961985 | 12/1999 |
| WO | 200147248 | 6/2001 |
| WO | 200153994 | 7/2001 |
| WO | 02052540 A1 | 7/2002 |
| WO | 2003093950 A2 | 11/2003 |
| WO | 2005013047 A2 | 2/2005 |
| WO | 2005079071 A1 | 8/2005 |
| WO | 2007023120 A1 | 3/2007 |
| WO | 2010018429 A1 | 2/2010 |
| WO | 2011100264 A3 | 11/2011 |
| WO | 2011157891 A1 | 12/2011 |
| WO | 2012056326 A2 | 5/2012 |
| WO | 2012106269 | 8/2012 |
| WO | 2013139239 A1 | 9/2013 |
| WO | 2014004181 | 1/2014 |
| WO | 2014116693 A1 | 7/2014 |
| WO | 2014145746 | 9/2014 |

OTHER PUBLICATIONS

First Action Interview Pilot Program Pre-Interview Communication dated Apr. 3, 2017, issued in connection with U.S. Appl. No. 14/495,590, filed Sep. 24, 2014, 5 pages.

Huang C.M., et al., "A Synchronization Infrastructure for Multicast Multimedia at the Presentation Layer," IEEE Transactions on Consumer Electronics, 1997, pp. 370-380, vol. 43, No. 3.

International Bureau, International Preliminary Report on Patentability dated Jan. 30, 2014, issued in connection with International Application No. PCT/US2012/047620, filed on Jul. 20, 2012, 7 pages.

International Bureau, International Preliminary Report on Patentability dated Apr. 3, 2014, issued in connection with International Application No. PCT/US2012/056467, filed on Sep. 21, 2011, 11 pages.

International Bureau, International Preliminary Report on Patentability, dated Aug. 6, 2015, issued in connection with International Application No. PCT/US2014/012534, filed on Jan. 22, 2014, 6 pages.

International Bureau, International Preliminary Report on Patentability dated Dec. 15, 2016, issued in connection with International Application No. PCT/US2015/031934, filed on May 21, 2015, 11 pages.

International Bureau, International Preliminary Report on Patentability dated Aug. 18, 2016, issued in connection with International Application No. PCT/US2015/014156, filed on Feb. 3, 2015, 10 pages.

International Bureau, International Preliminary Report on Patentability dated Sep. 15, 2016, issued in connection with International Application No. PCT/US2015/018850, filed on Mar. 15, 2015, 10 pages.

International Searching Authority, International Preliminary Report on Patentability dated Apr. 6, 2017, issued in connection with International Application No. PCT/US2015/051968 filed on Sep. 24, 2015, 10 pages.

International Searching Authority, International Preliminary Report on Patentability dated Apr. 6, 2017, issued in connection with International Application No. PCT/US2015/051975 filed on Sep. 24, 2015, 9 pages.

International Searching Authority, International Preliminary Report on Patentability dated Apr. 6, 2017, issued in connection with International Application No. PCT/US2015/051983 filed on Sep. 24, 2015, 7 pages.

International Searching Authority, International Preliminary Report on Patentability dated Apr. 6, 2017, issued in connection with International Application No. PCT/US2015/051989 filed on Sep. 24, 2015, 7 pages.

International Searching Authority, International Preliminary Report on Patentability dated Apr. 6, 2017, issued in connection with International Application No. PCT/US2015/051993 filed on Sep. 24, 2015, 8 pages.

International Searching Authority, International Preliminary Report on Patentability dated Feb. 23, 2017, issued in connection with International Application No. PCT/US2015/044218, filed on Aug. 7, 2015, 10 pages.

International Searching Authority, International Search Report and Written Opinion dated Nov. 6, 2015, issued in connection with International Application No. PCT/US2015/051993, filed on Sep. 24, 2015, 10 pages.

International Searching Authority, International Search Report and Written Opinion dated Dec. 7, 2015, issued in connection with International Application No. PCT/US2015/051968, filed on Sep. 24, 2015, 14 pages.

International Searching Authority, International Search Report and Written Opinion dated Dec. 16, 2015, issued in connection with International Application No. PCT/US2015/051989 filed on Sep. 24, 2015, 11 pages.

International Searching Authority, International Search Report and Written Opinion dated Dec. 21, 2015, issued in connection with International Application No. PCT/US2015/051983 filed on Sep. 24, 2015, 11 pages.

International Searching Authority, International Search Report and Written Opinion dated Nov. 23, 2015, issued in connection with International Application No. PCT/US2015/051975, filed on Sep. 24, 2015, 14 pages.

International Searching Authority, International Search Report and Written Opinion dated Apr. 24, 2015, issued in connection with International Application No. PCT/US2015/014156, filed on Feb. 3, 2015, 13 pages.

International Searching Authority, International Search Report and Written Opinion dated Aug. 27, 2015, issued in connection with International Application No. PCT/US2015/031934, filed on May 21, 2015, 14 pages.

International Searching Authority, International Search Report and Written Opinion dated Nov. 27, 2015, issued in connection with International Application No. PCT/US2015/044218, filed on Aug. 7, 2015, 13 pages.

International Searching Authority, International Search Report and Written Opinion dated May 29, 2015, issued in connection with International Application No. PCT/US2015/018850, filed on Mar. 5, 2015, 13 pages.

International Searching Authority, International Search Report dated May 8, 2014, issued in connection with International Application No. PCT/US2014/012534, filed on Jan. 24, 2014, 3 pages.

International Searching Authority, International Search Report dated Dec. 27, 2012, issued in connection with International Application No. PCT/US2012/047620, filed on Jul. 20, 2011, 3 pages.

International Searching Authority, Written Opinion dated Dec. 27, 2012, issued in connection with International Application No. PCT/US2012/047620, filed on Jul. 20, 2011, 5 pages.

(56) References Cited

OTHER PUBLICATIONS

International Searhing Authority, International Search Report and Written Opinion dated Feb. 28, 2013, issued in connection with International Application No. PCT/US2012/056467, filed on Sep. 21, 2012, 12 pages.
Ishibashi et al., "A Group Synchronization Mechanism for Live Media in Multicast Communications," IEEE Global Telecommunications Conference, 1997, pp. 746-752, vol. 2.
Ishibashi et al., "A Group Synchronization Mechanism for Stored Media in Multicast Communications," IEEE Information Revolution and Communications, 1997, pp. 692-700, vol. 2.
Japanese Patent Office, Full English Translation of Office Action dated Nov. 28, 2017, issued in connection with Japanese Patent Application No. 2016-555529, 2 pages.
Japanese Patent Office, Notice of Rejection dated Nov. 8, 2016, issued in connection with Japanese Application No. 2015-555237, 6 pages.
Japanese Patent Office, Office Action dated Nov. 28, 2017, issued in connection with Japanese Patent Application No. 2016-555529, 5 pages.
Japanese Patent Office, Office Action dated Nov. 7, 2017, issued in connection with Japanese Patent Application No. 2016-550231, 5 pages.
Jo et al., "Synchronized one-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Mills David L., "Network Time Protocol (Version 3) Specification, Implementation and Analysis," Network Working Group, Mar. 1992, 7 pages.
Mills, David L., "Precision Synchronization of Computer Network Clocks," ACM SIGCOMM Computer Communication Review, 1994, pp. 28-43, vol. 24, No. 2.
MOTOROLA, "Simplefi, Wireless Digital Audio Receiver, Installation and User Guide," Dec. 31, 2001, 111 pages.
Nilsson, M., "ID3 Tag Version 2," Mar. 26, 1998, 28 pages.
Non-Final Office Action dated Nov. 1, 2016, issued in connection with U.S. Appl. No. 14/173,253, filed Feb. 5, 2014, 21 pages.
Non-Final Office Action dated Oct. 1, 2015, issued in connection with U.S. Appl. No. 13/748,357, filed Jan. 23, 2013, 18 pages.
Non-Final Office Action dated Oct. 3, 2017, issued in connection with U.S. Appl. No. 14/495,633, filed Sep. 24, 2014, 18 pages.
Non-Final Office Action dated Apr. 6, 2016, issued in connection with U.S. Appl. No. 14/297,193, filed Jun. 5, 2014, 26 pages.
Non-Final Office Action dated May 6, 2015, issued in connection with U.S. Appl. No. 13/748,357, filed Jan. 23, 2013, 17 pages.
Non-Final Office Action dated Jul. 10, 2017, issued in connection with U.S. Appl. No. 14/297,193, filed Jun. 5, 2014, 33 pages.
Non-Final Office Action dated Sep. 10, 2015, issued in connection with U.S. Appl. No. 14/197,403, filed Mar. 5, 2014, 16 pages.
Non-Final Office Action dated Jan. 12, 2017, issued in connection with U.S. Appl. No. 14/275,112, filed May 12, 2014, 25 pages.
Non-Final Office Action dated Jun. 14, 2017, issued in connection with U.S. Appl. No. 14/495,659, filed Sep. 24, 2014, 15 pages.
Dell, Inc. "Start Here," Jun. 2000, 2 pages.
"Denon 2003-2004 Product Catalog," Denon, 2003-2004, 44 pages.
European Patent Office, EP Supplemental Search dated Dec. 19, 2017, issued in connection with EP Application No. 15829058.5, 12 pages.
European Patent Office, European Office Action dated Aug. 3, 2017, issued in connection with EP Application No. 15781794.1, 6 pages.
European Patent Office, European Supplemental Search Report dated Sep. 18, 2017, issued in connection with EP Application No. 15829058.5, 13 pages.

European Patent Office, European Supplemental Search Report dated Jan. 27, 2016, issued in connection with European Application No. 14743335.3, 8 pages.
European Patent Office, Examination Report dated Feb. 3, 2017, issued in connection with European Patent Application No. 14743335.3, 5 pages.
European Patent Office, Extended European Search Report dated Mar. 15, 2017, issued in connection with European Application No. 15758460.8, 9 pages.
European Patent Office, Extended European Search Report dated Dec. 23, 2016, issued in connection with European Application No. 15746781.2, 10 pages.
European Patent Office, Office Action dated Mar. 2, 2017, issued in connection with European Application No. 15775566.1, 7 pages.
European Patent Office, Office Action dated Apr. 4, 2017, issued in connection with European Application No. 15775897.0, 6 pages.
European Patent Office, Office Action dated Jan. 13, 2017, issued in connection with European Application No. 15781794.1, 8 pages.
European Patent Office, Office Action dated Mar. 13, 2017, issued in connection with European Application No. 15781200.9, 5 pages.
Final Office Action dated Nov. 2, 2017, issued in connection with U.S. Appl. No. 14/275,112, filed May 12, 2014, 20 pages.
Final Office Action dated Nov. 3, 2016, issued in connection with U.S. Appl. No. 14/495,684, filed Sep. 24, 2014, 16 pages.
Final Office Action dated Apr. 6, 2016, issued in connection with U.S. Appl. No. 14/173,253, filed Feb. 5, 2014, 20 pages.
Final Office Action dated Feb. 7, 2017, issued in connection with U.S. Appl. No. 14/455,651, filed Aug. 8, 2014, 22 pages.
Final Office Action dated Oct. 7, 2016, issued in connection with U.S. Appl. No. 14/495,595, filed Sep. 24, 2014, 16 pages.
Final Office Action dated Nov. 8, 2016, issued in connection with U.S. Appl. No. 14/495,659, filed Sep. 24, 2014, 14 pages.
Final Office Action dated Feb. 10, 2016, issued in connection with U.S. Appl. No. 14/197,403, filed Mar. 5, 2014, 21 pages.
Final Office Action dated Feb. 16, 2017, issued in connection with U.S. Appl. No. 14/495,633, filed Sep. 24, 2014, 15 pages.
Final Office Action dated Sep. 16, 2016, issued in connection with U.S. Appl. No. 14/275,112, filed May 12, 2014, 19 pages.
Final Office Action dated Jan. 19, 2018, issued in connection with U.S. Appl. No. 14/297,193, filed Jun. 5, 2014, 32 pages.
Final Office Action dated Oct. 20, 2016, issued in connection with U.S. Appl. No. 14/197,403, filed Mar. 5, 2016, 17 pages.
Final Office Action dated Sep. 30, 2016, issued in connection with U.S. Appl. No. 14/297,193, filed Jun. 5, 2014, 34 pages.
Final Office Action dated May 31, 2017, issued in connection with U.S. Appl. No. 14/173,253, filed Feb. 5, 2014, 22 pages.
Final Office Action dated May 31, 2017, issued in connection with U.S. Appl. No. 14/821,513, filed Aug. 7, 2015, 16 pages.
First Action Interview Office Action dated Apr. 4, 2016, issued in connection with U.S. Appl. No. 14/275,112, filed May 12, 2014, 8 pages.
First Action 1Interview Office Action dated Jul. 7, 2016, issued in connection with U.S. Appl. No. 14/495,595, filed Sep. 24, 2014, 6 pages.
First Action Interview Office Action dated Jul. 11, 2016, issued in connection with U.S. Appl. No. 14/495,684, filed Sep. 24, 2014, 8 pages.
First Action Interview Office Action dated Jul. 13, 2016, issued in connection with U.S. Appl. No. 14/455,651, filed Aug. 8, 2014, 10 pages.
First Action Interview Office Action dated Oct. 13, 2016, issued in connection with U.S. Appl. No. 14/495,633, filed Sep. 24, 2014, 8 pages.
First Action Interview Office Action dated Dec. 14, 2016, issued in connection with U.S. Appl. No. 14/821,513, filed Aug. 7, 2015, 10 pages.
First Action Interview Office Action dated Jul. 22, 2016, issued in connection with U.S. Appl. No. 14/495,659, filed Sep. 24, 2014, 8 pages.
Advisory Action dated Feb. 1, 2017, issued in connection with U.S. Appl. No. 14/297,193, filed Jun. 5, 2014, 6 pages.
Advisory Action dated Feb. 3, 2017, issued in connection with U.S. Appl. No. 14/495,659, filed Sep. 24, 2014, 5 pages.

(56) References Cited

OTHER PUBLICATIONS

Advisory Action dated Jul. 12, 2016, issued in connection with U.S. Appl. No. 14/173,253, filed Feb. 5, 2014, 5 pages.
Advisory Action dated Aug. 22, 2017, issued in connection with U.S. Appl. No. 14/173,253, filed Feb. 5, 2014, 4 pages.
Akyildiz et al., "Multimedia Group Synchronization Protocols for Integrated Services Networks," IEEE Journal on Selected Areas in Communications, 1996 pp. 162-173, vol. 14, No. 1.
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Benslimane Abderrahim, "A Multimedia Synchronization Protocol for Multicast Groups," Proceedings of the 26th Euromicro Conference, 2000, pp. 456-463, vol. 1.
Biersack et al., "Intra- and Inter-Stream Synchronization for Stored Multimedia Streams," IEEE International Conference on Multimedia Computing and Systems, 1996, pp. 372-381.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Bretl W.E., et al., MPEG2 Tutorial [online], 2000 [retrieved on Jan. 13, 2009] Retrieved from the Internet: http://www.bretl.com/mpeghtml/MPEGindex.htm, pp. 1-23.
Chinese Patent Office, First Office Action dated Sep. 4, 2017, issued in connection with Chinese Application No. 2014800172148.0, 16 pages.
Corrected Notice of Allowability dated Jan. 19, 2017, issued in connection with U.S. Appl. No. 14/197,403, filed Mar. 5, 2014, 2 pages.
Dell, Inc. "Dell Digital Audio Receiver: Reference Guide," Jun. 2000, 70 pages.
Non-Final Office Action dated Dec. 17, 2015, issued in connection with U.S. Appl. No. 14/173,253, filed Feb. 5, 2014, 18 pages.
Non-Final Office Action dated Jun. 17, 2016, issued in connection with U.S. Appl. No. 14/495,706, filed Sep. 24, 2014, 19 pages.
Non-Final Office Action dated May 18, 2016, issued in connection with U.S. Appl. No. 14/197,403, filed Mar. 5, 2014, 21 pages.
Non-Final Office Action dated Jan. 24, 2018, issued in connection with U.S. Appl. No. 15/607,267, filed May 26, 2017, 17 pages.
Non-Final Office Action dated Nov. 28, 2017, issued in connection with U.S. Appl. No. 14/821,513, filed Aug. 7, 2015, 17 pages.
North American MPEG-2 Information, "The MPEG-2 Transport Stream," Retrieved from the Internet: URL: http://www.coolstf.com/mpeg/#ts, 2006, pp. 1-5.
Notice of Allowance dated May 4, 2016, issued in connection with U.S. Appl. No. 13/748,357, filed Jan. 23, 2013, 11 pages.
Notice of Allowance dated Apr. 6, 2017, issued in connection with U.S. Appl. No. 14/197,403, filed Mar. 5, 2014, 5 pages.
Notice of Allowance dated Jan. 12, 2017, issued in connection with U.S. Appl. No. 14/495,595, filed Sep. 24, 2014, 5 pages.
Notice of Allowance dated Sep. 19, 2017, issued in connection with U.S. Appl. No. 14/455,651, filed Aug. 8, 2014, 12 pages.
Notice of Allowance dated Aug. 24, 2017, issued in connection with U.S. Appl. No. 14/495,590, filed Sep. 24, 2014, 10 pages.
Notice of Allowance dated Jan. 26, 2017, issued in connection with U.S. Appl. No. 14/495,706, filed Sep. 24, 2014, 8 pages.
Notice of Allowance dated Dec. 27, 2017, issued in connection with U.S. Appl. No. 14/495,659, filed Sep. 24, 2014, 6 pages.
Notice of Allowance dated Dec. 29, 2016, issued in connection with U.S. Appl. No. 14/197,403, filed Mar. 5, 2014, 5 pages.
Notice of Allowance dated May 31, 2017, issued in connection with U.S. Appl. No. 14/495,684, filed Sep. 24, 2014, 5 pages.
Notice of Allowance dated May 4, 2017, issued in connection with U.S. Appl. No. 14/495,595, filed Sep. 24, 2014, 5 pages.
Yamaha DME Designer 3.5 User Manual; Copyright 2004, 507 pages.
Palm, Inc., "Handbook for the Palm VII Handheld," May 2000, 311 pages.
Park et al., "Group Synchronization in MultiCast Media Communications," Proceedings of the 5th Research on Multicast Technology Workshop, 2003, 5 pages.
Polycom Conference Composer User Guide, copyright 2001, 29 pages.
Preinterview First Office Action dated May 4, 2016, issued in connection with U.S. Appl. No. 14/455,651, filed Aug. 8, 2014, 7 pages.
Preinterview First Office Action dated May 4, 2016, issued in connection with U.S. Appl. No. 14/495,659, filed Sep. 24, 2014, 6 pages.
Preinterview First Office Action dated May 5, 2016, issued in connection with U.S. Appl. No. 14/495,595, filed Sep. 24, 2014, 6 pages.
Preinterview First Office Action dated May 16, 2016, issued in connection with U.S. Appl. No. 14/495,633, filed Sep. 24, 2014, 6 pages.
Preinterview First Office Action dated Oct. 19, 2016, issued in connection with U.S. Appl. No. 14/821,513, filed Aug. 7, 2016, 5 pages.
Preinterview First Office Action dated May 23, 2016, issued in connection with U.S. Appl. No. 14/495,684, filed Sep. 24, 2014, 6 pages.
Presentations at WinHEC 2000, May 2000, 138 pages.
PRISMIQ, Inc., "PRISMIQ Media Player User Guide," 2003, 44 pages.
Rothermel et al., "An Adaptive Stream Synchronization Protocol," 5th International Workshop on Network and Operating System Support for Digital Audio and Video, 1995, 13 pages.
Schulzrinne H., et al., "RTP: A Transport Protocol for Real-Time Applications, RFC 3550," Network Working Group, 2003, pp. 1-89.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," 08 Jun. 2000; version 1.0; Microsoft Corporation; pp. 1-54.
U.S. Appl. No. 12/070,933, filed Feb. 22, 2008. "System, Method, and Computer Program for Remotely Managing a Digital Device" Inventor: Jonathan Lang, et al.
U.S. Appl. No. 13/533,105, filed Jun. 26, 2012. "Systems, Methods, Apparatus, and Articles of Manufacture to Provide a Crowd-Sourced Playlist with Guess Access" Inventor: Paul Bates, et al.
U.S. Appl. No. 13/533,785, filed Jun. 26, 2012. "Networked Music Playback Including Remote Discovery and Add to Queue" Inventor: Mark Triplett, et al.
U.S. Appl. No. 13/748,357, filed Jan. 23, 2013. "System and Method for a Media Experience Social Interface" Inventor: Ron Kuper, et al.
U.S. Appl. No. 13/871,785, filed Apr. 26, 2013. "Systems, Methods, Apparatus, and Articles of Manufacture to Provide Guest Access" Inventor: Paul Bates, et al.
U.S. Appl. No. 13/871,795, filed Jun. 20, 2013. "Systems, Methods, Apparatus, and Articles of Manufacture to Provide Guest Access" Inventor: Paul Bates, et al.
U.S. Appl. No. 14/173,253, filed Feb. 5, 2014. "Remote Creation of a Playback Queue for a Future Event" Inventor: Jaime Munoz, et al.
Van Buskirk, Eliot, "Music Needs 'Connective Tissue' and Facebook Wants to Build It," E http://evolver.fm/2011/09/01/music-needs-connective-tissue-and-facebook-wants-to-build-it, 2011, 6 pages.
Yamaha DME 32 manual: copyright 2001.
Yamaha DME 64 Owner's Manual; copyright 2004, 80 pages.
Yamaha DME Designer 3.5 setup manual guide; copyright 2004, 16 pages.
Chinese Patent Office, Second Office Action dated Apr. 11, 2018, issued in connection with Chinese Application No. 201480017214.8, 7 pages.
Chinese Patent Office, Third Office Action dated Oct. 18, 2018, issued in connection with Chinese Application No. 2014800172148, 8 pages.

(56) References Cited

OTHER PUBLICATIONS

European Patent Office, Decision to Refuse EP Application dated Oct. 16, 2018, issued in connection with European Application No. 157758970, 48 pages.
European Patent Office, Decision to Refuse EP Application dated Sep. 27, 2018, issued in connection with European Application No. 15781794.1, 54 pages.
European Patent Office, European Extended Search Report dated Feb. 5, 2018, issued in connection with EP Application No. 15803430.6, 8 pages.
European Patent Office, Summons to Attend Oral Proceedings dated Mar. 27, 2018, issued in connection with European Patent Application No. 15781794.1, 11 pages.
Final Office Action dated Mar. 28, 2018, issued in connection with U.S. Appl. No. 14/495,633, filed Sep. 24, 2014, 21 pages.
Final Office Action dated Oct. 29, 2018, issued in connection with U.S. Appl. No. 15/607,267, filed May 26, 2017, 17 pages.
Non-Final Office Action dated Nov. 13, 2018, issued in connection with U.S. Appl. No. 16/143,301, filed Sep. 26, 2018, 27 pages.
Non-Final Office Action dated Mar. 23, 2018, issued in connection with U.S. Appl. No. 15/227,074, filed Aug. 3, 2016, 11 pages.
Notice of Allowance dated Jul. 18, 2018, issued in connection with U.S. Appl. No. 15/227,074, filed Aug. 3, 2016, 8 pages.
Notice of Allowance dated Aug. 30, 2018, issued in connection with U.S. Appl. No. 14/821,513, filed Aug. 7, 2015, 10 pages.
Pre-Brief Conference Decision dated Sep. 7, 2018, issued in connection with U.S. Appl. No. 14/297,193, filed Jun. 5, 2014, 2 pages.

\* cited by examiner

REMOTE CREATION OF A PLAYBACK QUEUE FOR A FUTURE EVENT

CROSS REFERENCE TO RELATED APPLICATIONS

This application claims priority under 35 U.S.C. § 120 to, and is a continuation of, U.S. patent application Ser. No. 14/173,253, filed on Feb. 5, 2014, entitled "Remote Creation of a Playback Queue for a Future Event," which is incorporated herein by reference in its entirety.

FIELD OF THE DISCLOSURE

The disclosure is related to consumer goods and, more particularly, to methods, systems, products, features, services, and other items directed to media playback or some aspect thereof.

BACKGROUND

Digital music has become readily available due in part to the development of consumer level technology that has allowed people to listen to digital music on a personal audio device. The consumer's increasing preference for digital audio has also resulted in the integration of personal audio devices into PDAs, cellular phones, and other mobile devices. The portability of these mobile devices has enabled people to take the music listening experience with them and outside of the home. People have become able to consume digital music, like digital music files or even Internet radio, in the home through the use of their computer or similar devices. Now there are many different ways to consume digital music, in addition to other digital content including digital video and photos, stimulated in many ways by high-speed Internet access at home, mobile broadband Internet access, and the consumer's hunger for digital media.

Until recently, options for accessing and listening to digital audio in an out-loud setting were severely limited. In 2005, Sonos offered for sale its first digital audio system that enabled people to, among many other things, access virtually unlimited sources of audio via one or more networked connected zone players, dynamically group or ungroup zone players upon command, wirelessly send the audio over a local network amongst zone players, and play the digital audio out loud across multiple zone players in synchrony. The Sonos system can be controlled by software applications running on network capable mobile devices and computers.

BRIEF DESCRIPTION OF THE DRAWINGS

Features, aspects, and advantages of the presently disclosed technology may be better understood with regard to the following description, appended claims, and accompanying drawings where:

Figure 1A:
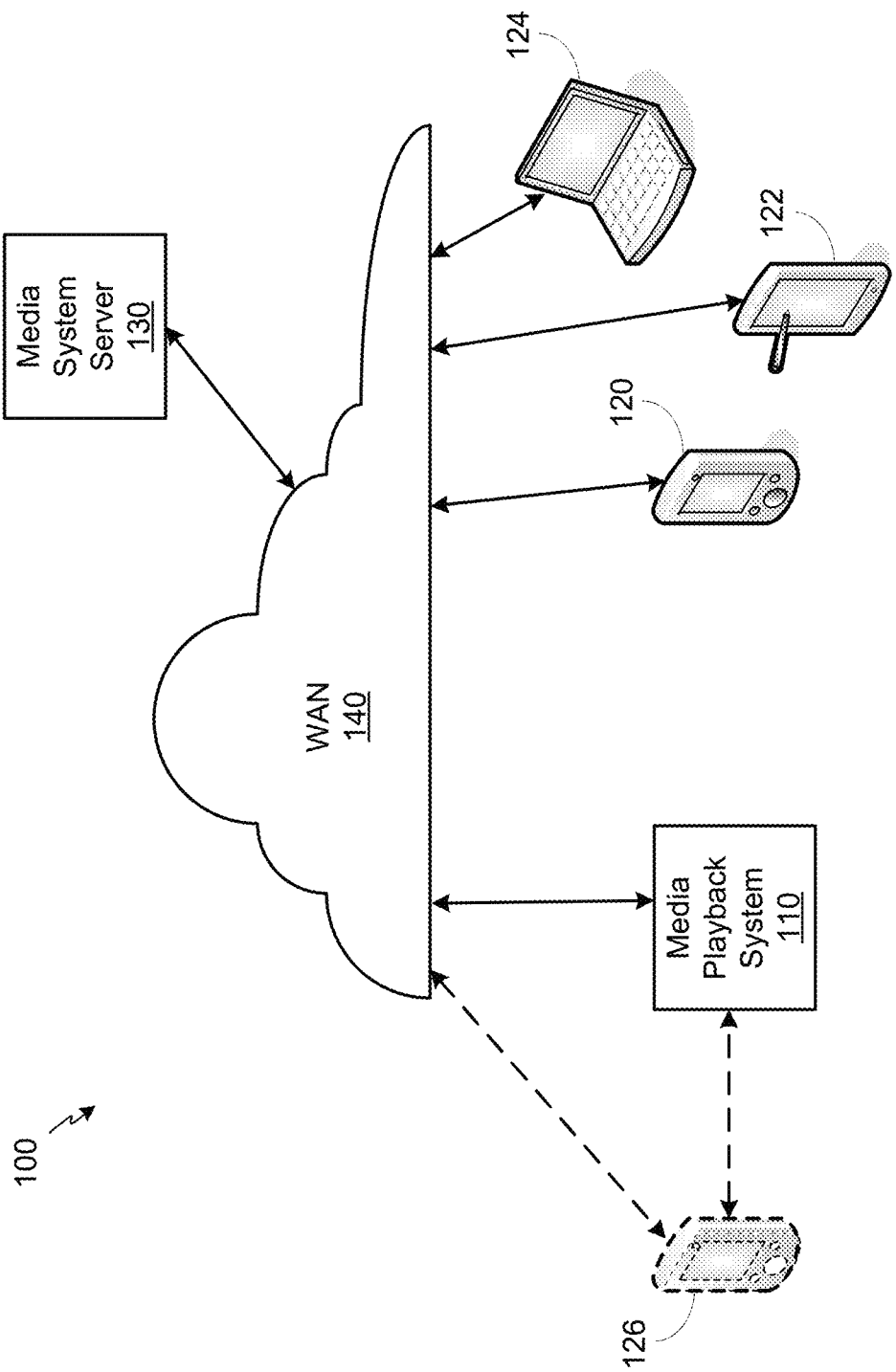
FIG. 1A shows an example network configuration in which certain embodiments may be practiced.

In addition, the drawings are for the purpose of illustrating example embodiments, but it is understood that the inventions are not limited to the arrangements and instrumentality shown in the drawings.

DETAILED DESCRIPTION

I. Overview

Embodiments are described herein that may allow for the remote creation of a playback queue of a media playback system in advance of an event. The playback queue may include identification of one or more media items (e.g., songs, videos, streaming data sources, etc.) that are intended to be played on the media playback system during the event.

The playback queue may be created or modified prior to an event where the playback queue may be played by a media playback system. For example, a person may be planning a celebration (e.g., a wedding, birthday party, etc.) for some time in the future and may want to allow guests to, prior to the celebration, add music, videos, etc. to a playback queue that will be played at the celebration.

In example embodiments, the playback queue may be created or modified by one or more remote computing devices that are in communication with the media playback system via at least a wide area network (WAN). The remote computing device may receive an electronic invitation prior to the event that permits a user of the remote computing device to add one or more media items to the playback queue.

A computing system communicatively coupled to the WAN may store, facilitate the creation of, and otherwise manage the playback queue. The computing system may receive annotation data before, during, and/or after the event that is associated with a media item from the playback queue. The annotation data may be used to tag annotations, such as messages, videos, photos, or social media statuses, to the media items. The computing system may provide the playback queue along with the tags for view by the guests, which may promote a more memorable event experience.

As indicated above, the present application involves remotely creating a playback queue of a media playback system by remote computing devices in communication with the media playback system via a WAN. In one aspect, a method is provided. The method involves receiving by a computing device an electronic invitation to add at least one media item to a playback queue of a media playback system, where the electronic invitation comprises a link to access information identifying a set of media items available for playback by the media playback system, and where the computing device and the media playback system are communicatively coupled via at least a WAN. The method further involves causing by the computing device a graphical display to display the information identifying the set of media items available for playback by the media playback system. The method further involves sending by the computing device selection data that indicates a selection of a particular media item from the set of media items to be added to the playback queue of the media playback system.

In another aspect, a non-transitory computer readable medium is provided. The non-transitory computer readable having instructions stored thereon that are executable by at least one processor. The instructions include instructions for receiving by a computing device an electronic invitation to add at least one media item to a playback queue of a media playback system, where the electronic invitation comprises a link to access information identifying a set of media items available for playback by the media playback system, and where the computing device and the media playback system are communicatively coupled via at least a WAN. The instructions further include instructions for causing by the computing device a graphical display to display the information identifying the set of media items available for playback by the media playback system. The instructions further include instructions for sending by the computing device selection data that indicates a selection of a particular media item from the set of media items to be added to the playback queue of the media playback system.

In one other aspect, a computing device is provided. The computing device includes a graphical display, a network interface, a non-transitory computer readable medium, and program instructions stored on the non-transitory computer readable medium. The program instructions are executable by at least one processor to cause the computing device to receive an electronic invitation to add at least one media item to a playback queue of a media playback system, where the electronic invitation comprises a link to access information identifying a set of media items available for playback by the media playback system, and where the computing device and the media playback system are communicatively coupled via at least a WAN. The program instructions are executable by the at least one processor to further cause the computing device to cause the graphical display to display the information identifying the set of media items available for playback by the media playback system. The program instructions are executable by the at least one processor to further cause the computing device to send selection data that indicates a selection of a particular media item from the set of media items to be added to the playback queue of the media playback system.

In another aspect, a method is provided. The method involves providing, by a computing system that is communicatively coupled to a media playback system via a WAN, a plurality of electronic invitations to a plurality of respective remote computing devices to add at least one media item to a playback queue of the media playback system, where each of the plurality of electronic invitations comprises a link to access information identifying one or more media items available for playback by the media playback system. The method further involves receiving by the computing system selection data that indicates one or more media item selections associated with one or more of the plurality of electronic invitations. The method further involves populating by the computing system the playback queue based on the one or more media item selections indicated by the received selection data.

In an additional aspect, a non-transitory computer readable medium is provided. The non-transitory computer readable having instructions stored thereon that are executable by at least one processor. The instructions include instructions for providing, by a computing system that is communicatively coupled to a media playback system via a WAN, a plurality of electronic invitations to a plurality of respective remote computing devices to add at least one media item to a playback queue of the media playback system, where each of the plurality of electronic invitations comprises a link to access information identifying one or more media items available for playback by the media playback system. The instructions further include instructions for receiving by the computing system selection data that indicates one or more media item selections associated with one or more of the plurality of electronic invitations. The instructions further include instructions for populating by the computing system the playback queue based on the one or more media item selections indicated by the received selection data.

In a further aspect, a computing system is provided. The computing device includes a network interface, a non-transitory computer readable medium, and program instructions stored on the non-transitory computer readable medium. The network interface communicatively couples the computing system to a media playback system via a WAN. The program instructions are executable by at least one processor to cause the computing system to provide a plurality of electronic invitations to a plurality of respective remote computing devices to add at least one media item to a playback queue of the media playback system, where each of the plurality of electronic invitations comprises a link to access information identifying one or more media items available for playback by the media playback system. The program instructions are executable by the at least one processor to further cause the computing device to receive selection data that indicates one or more media item selections associated with one or more of the plurality of electronic invitations. The program instructions are executable by the at least one processor to further cause the computing device to populate the playback queue based on the one or more media item selections indicated by the received selection data.

Other embodiments, as those discussed in the following and others as can be appreciated by one having ordinary skill in the art are also possible.

II. Example Network Configuration

Referring now to the drawings, in which like numerals can refer to like parts throughout the figures, FIG. 1A shows an example network configuration 100 in which one or more embodiments disclosed herein can be practiced or implemented.

The network configuration 100 may include a media playback system 110, one or more computing devices 120, 122, and 124, a media system server 130, and a wide area network ("WAN") 140. The network configuration 100 may additionally include a computing device 126 that is associated with the media playback system 110 such that the computing device 126 may control access to information related to the media playback system 110. It should be understood that the network configuration 100 may include a plurality of the depicted components and/or may also include various other components, such as, content-provider servers (e.g., Internet radio servers), without departing from the present invention.

The WAN 140 may communicatively couple the various components of the network configuration 100. For example, in such an arrangement, any of the computing devices 120-124 may communicate with the media system server 130 and/or the media playback system 110 via the WAN 140. Similarly, the media playback system 110 and the media system server 130 may communicate via the WAN 140. The WAN 140 may include the Internet and/or a cellular network, among other networks. In example implementations that include the computing device 126, the computing device 126 may be communicatively coupled to the media playback system 110 via a local area network (e.g., via WiFi) or a personal area network (e.g., via Bluetooth), among other possibilities.

In order to distinguish between a computing device associated with the media playback system 110 (e.g., the computing device 126) and a computing device not associated with the media playback system 110 (e.g., the computing devices 120-124), and because the computing devices 120-124 are communicatively coupled to the media playback system 110 via at least the WAN 140, hereinafter the computing devices 120-124 may be referred to as "remote computing devices."

Generally speaking, the media playback system 110 may be any media playback system configured to receive data over a WAN and playback media items. The media playback system 110 is discussed in further detail below with reference to example media playback system 200.

In general, each computing device 120-126 may be any computing device configured to communicate over a WAN. The computing devices 120-126 may include at least one processor, memory, a graphical display, an input interface, and a network interface, among other components. In some instances, the graphical display and the input interface may be part of the same component (e.g., a touchscreen). The network interface may facilitate data flow between the computing device and another device via the WAN 140. The computing devices 120-126 may also include a camera configured to capture image data. Example computing devices include, but are not limited to, cellular phones, smartphones, PDAs, tablets, laptops, desktop computers, video game consoles, and smart TVs.

The media system server 130 may include at least one processor, memory, and a network interface, among other components. The network interface may facilitate data flow between the media system server 130 and another device on the WAN 140.

Figure 1B:
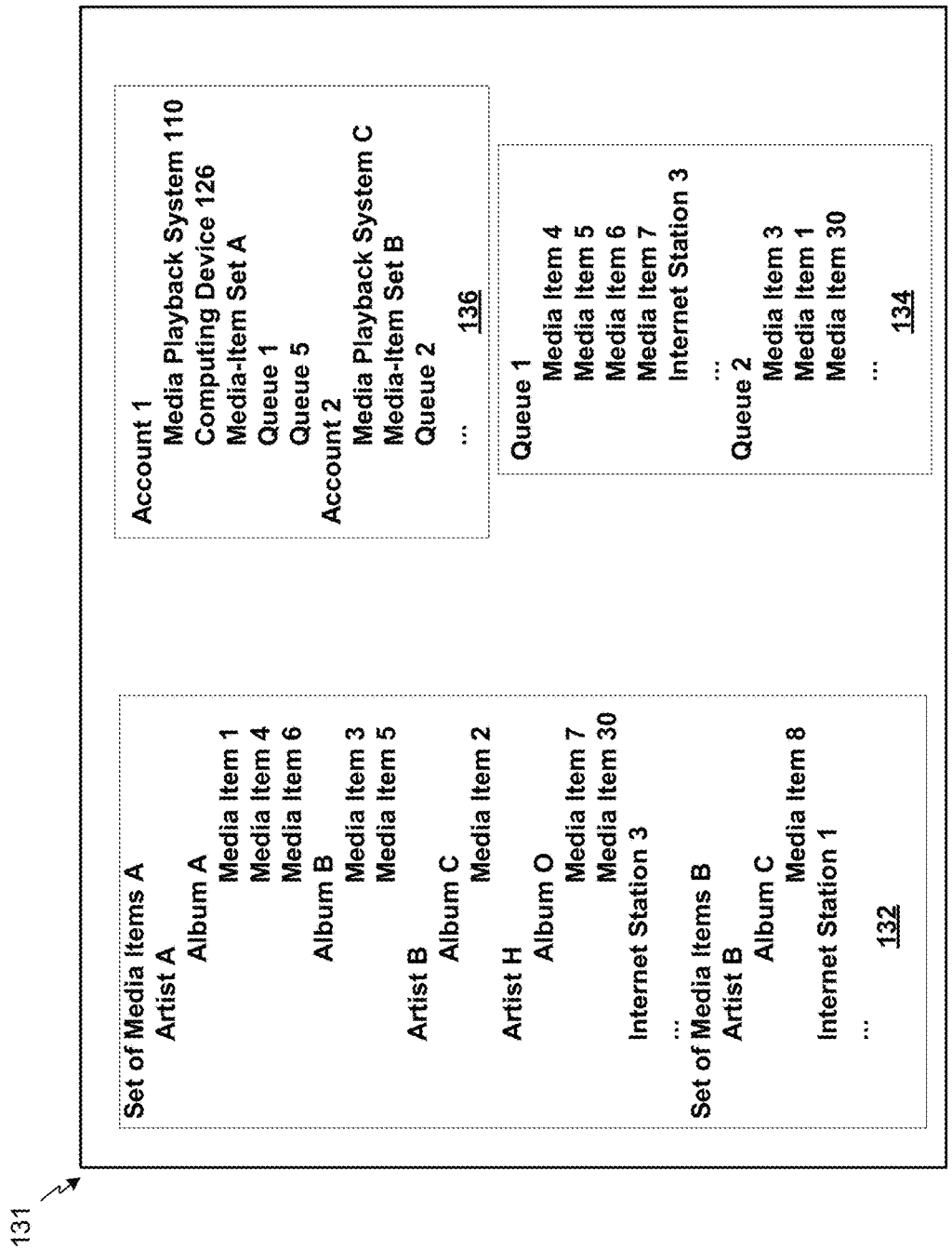
FIG. 1B shows an example database stored in memory of a media system server, according to example embodiments.

The media system server 130 may store a database in memory that contains various data that may include, for example, one or more sets of media items, one or more playback queues, and/or account information associated with a particular media playback system, among other data. FIG. 1B illustrates an example database 131 stored in memory of the media system server 130, according to example embodiments. As shown, the database 131 may include sets of media items 132, playback queues 134, and account information 136, among other data.

A set of media items may include one or more media items that are available for playback by a particular media playback system. Example media items may include audio files, video files, audio-visual files, and streaming data sources (e.g., Internet radio stations), among other types of media items. In some implementations, the media items may be a collection of links or pointers (i.e., URI) to the underlying data for media items that are stored elsewhere, such as on a remote source on the WAN 140. Additionally or alternatively, the media items may include pointers to media content stored on a device local to a media playback system. Further, a media item may include one or more identifiers (e.g., a media-item title, an artist name, an album title, a genre, etc.) that are associated with the media item that is available to be played on a particular media playback system. As shown in FIG. 1B, the sets of media items 132 include media-item files and streaming data sources. The sets of media items further include one or more identifiers for each media item (e.g., media-item titles, artist names, and/or album titles). Other examples of sets of media items are certainly possible.

A playback queue (or simply "queue") may include identification of one or more media items (e.g., songs, videos, Internet broadcasts, etc.) that are intended to be played on a particular media playback system. For example, as shown in FIG. 1B, the playback queues 134 may include media-item title identifiers, among other possibilities. In some implementations, the media-item titles may be mapped to a link, a pointer, or other similar mechanism for locating the underlying data of the media item.

A media playback system may be configured to play media items from the queue according to a specific order (such as an order in which the media items were added), in a random order, or in some other order. A playback queue may be created or modified by receiving selection data from one or more computing devices (e.g., any of the computing devices 120-126). Playback queues are discussed in further detail below.

Account information may include associations between one or more computing devices, one or more media playback systems, one or more playback queues, and/or one or more sets of media items, among other associations. As shown in FIG. 1B, the database 131 of the media system server 130 may store account information 136 that includes account information associated with the media playback system 110. The account information may indicate a set of media items (e.g., Set of Media Items A) associated with the media playback system 110 where the associated set of media items may indicate the media items available for playback on the media playback system 110. The account information may also indicate an association between one or more media queues (e.g., Playback Queues 1 and 5) and the media playback system 110 where the media queues may identify media items that are intended to be played on the media playback system 110, for example, during a particular event. Further, the account information may indicate that the computing device 126 is associated with the media playback system 110 such that the computing device 126 may control access to the set of media items and/or the playback queues associated with the media playback system 110. For example, the computing device 126 may be used to send instruction data to the media system server 130. Instruction data and various aspects of the network configuration 100 are discussed in further detail below.

III. Example Media Playback System

Figure 2:
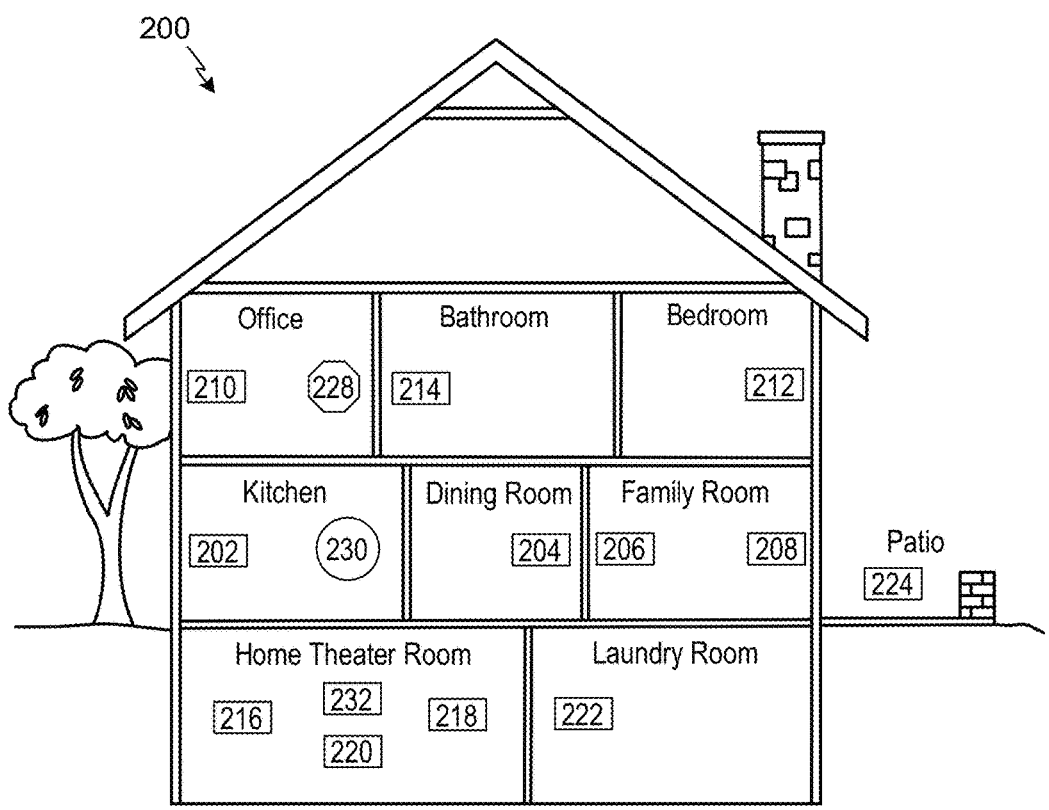
FIG. 2 shows an example media playback system, according to example embodiments.

FIG. 2 shows an example media playback system 200, according to an example embodiment. It should be understood that the media playback system 200 is but one example of the media playback system 110 of the network configuration 100 and should not be construed as limiting.

By way of illustration, the media playback system 200 is associated with a home having multiple zones, although it should be understood that the home could be configured with only one zone. Additionally, one or more zones can be added to the media playback system 200 over time. Each zone may be assigned by a user to a different room or space, such as, for example, an office, bathroom, bedroom, kitchen, dining room, family room, home theater room, utility or laundry room, and patio. A single zone might also include multiple rooms or spaces if so configured. With respect to FIG. 2, one or more of zone players 202-224 are shown in each respective zone. The zone players 202-224, also referred to herein as playback devices, multimedia units, speakers, players, and so on, provide audio, video, and/or audiovisual output. A controller 230 (e.g., shown in the kitchen for purposes of this illustration) provides control to the media playback system 200. The controller 230 may be fixed to a zone, or alternatively, it may be mobile such that it can be moved about the zones. The media playback system 200 may also include more than the one controller 230, and additional controllers may be added to the system over time.

The media playback system 200 illustrates an example whole house media system, though it is understood that the technology described herein is not limited to, among other things, its particular place of application or to an expansive system like the whole house media playback system 200 of FIG. 2.

1. Example Zone Players

Figure 3A:
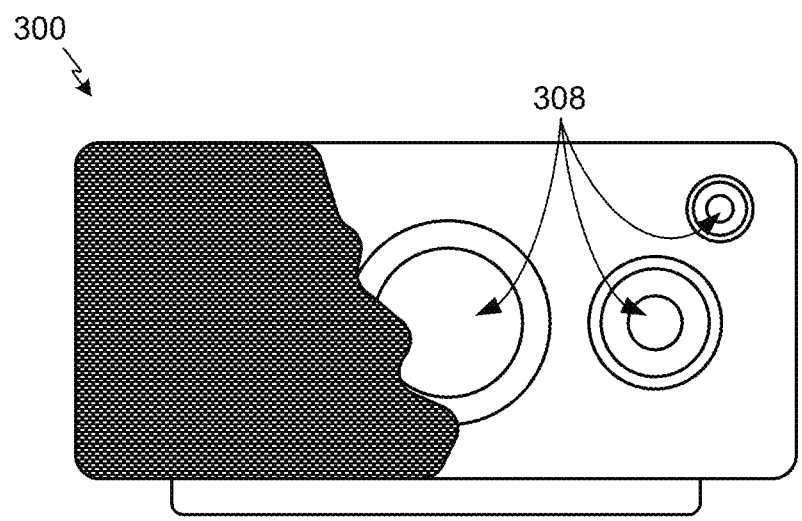
FIG. 3A shows an illustration of an example zone player having a built-in amplifier and transducers.
Figure 3B:
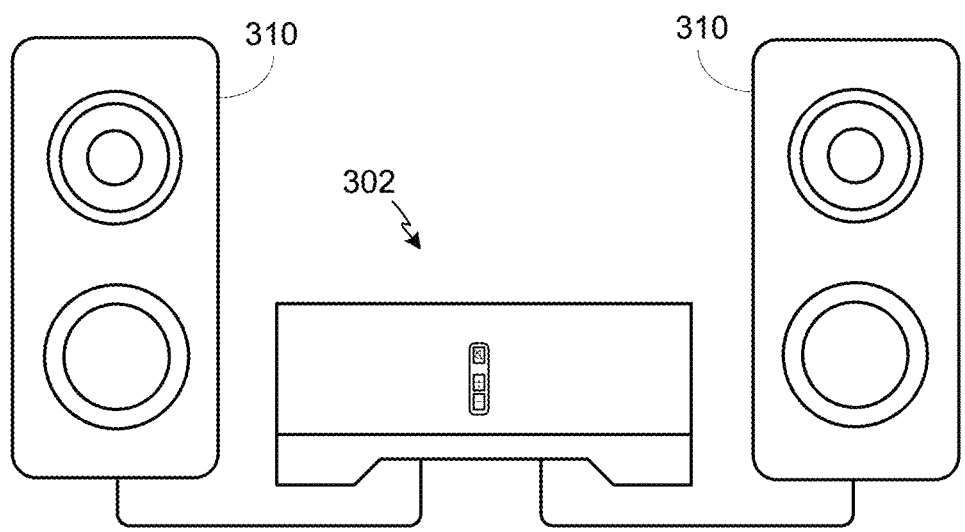
FIG. 3B shows an illustration of an example zone player having a built-in amplifier and connected to external speakers.
Figure 3C:
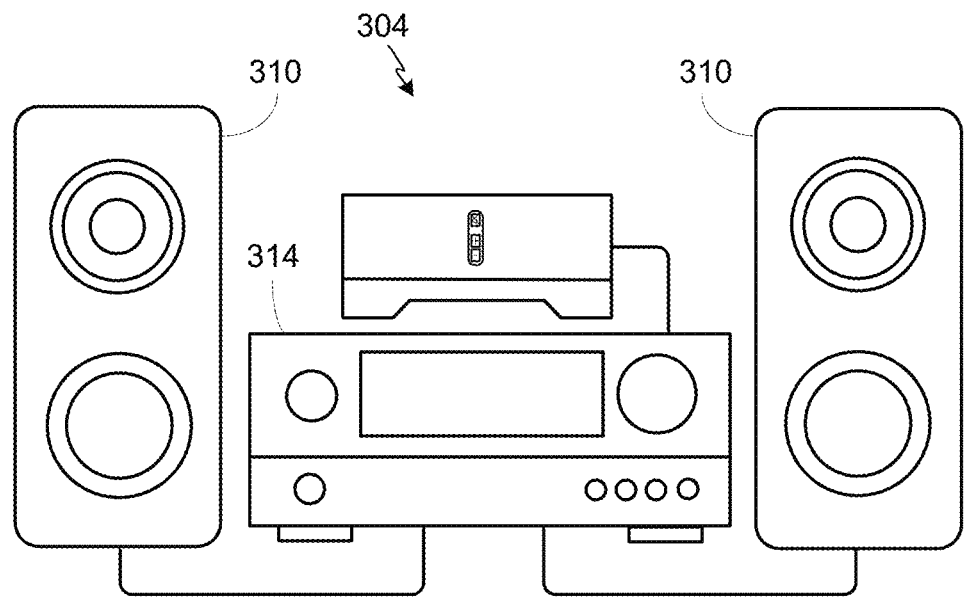
FIG. 3C shows an illustration of an example zone player connected to an A/V receiver and speakers.

FIGS. 3A, 3B, and 3C show example types of zone players. Zone players 300, 302, and 304 of FIGS. 3A, 3B, and 3C, respectively, can correspond to any of the zone players 202-224 of FIG. 2, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, each zone player 300-304 may also be referred to as a "smart speaker," because they may contain processing capabilities beyond the reproduction of audio, more of which is described below.

FIG. 3A illustrates the zone player 300 that includes sound producing equipment 308 capable of reproducing full-range sound. The sound may come from an audio signal that is received and processed by the zone player 300 over a wired or wireless data network. The sound producing equipment 308 may include one or more built-in amplifiers and one or more acoustic transducers (e.g., speakers). A built-in amplifier is described more below with respect to FIG. 5. A speaker or acoustic transducer can include, for example, any of a tweeter, a mid-range driver, a low-range driver, and a subwoofer. In some embodiments, the zone player 300 can be statically or dynamically configured to play stereophonic audio, monaural audio, or both. In some embodiments, the zone player 300 may be dynamically configured to reproduce a subset of full-range sound, such as when the zone player 300 is grouped with other zone players to play stereophonic audio, monaural audio, and/or surround audio or when the media content received by the zone player 300 is less than full-range.

FIG. 3B illustrates the zone player 302 that includes a built-in amplifier to power a set of detached speakers 310. A detached speaker can include, for example, any type of loudspeaker. The zone player 302 may be configured to power one, two, or more separate loudspeakers. The zone player 302 may be configured to communicate an audio signal (e.g., right and left channel audio or more channels depending on its configuration) to the set of detached speakers 310 via a wired path.

FIG. 3C illustrates the zone player 304 that does not include a built-in amplifier, but is configured to communicate an audio signal, received over a data network, to an audio (or "audio/video") receiver 314 with built-in amplification.

Referring back to FIG. 2, in some embodiments, one, some, or all of the zone players 202-224 can retrieve audio directly from a source. For example, a particular zone player in a zone or zone group may be assigned to a playback queue. The playback queue may contain information corresponding to zero or more media items (e.g., audio items) for playback by the associated zone or zone group. The playback queue may be stored in memory on a zone player or some other designated device. Each item contained in the playback queue may comprise a uniform resource identifier (URI) or some other identifier that can be used by the zone player(s) to seek out and/or retrieve the audio items from the identified audio source(s). Depending on the item, the audio source might be found on the Internet (e.g., the cloud), locally from another device over the data network 228 (described further below), from the controller 230, stored on the zone player itself, or from an audio source communicating directly to the zone player. In some embodiments, the zone player can reproduce the audio itself (e.g., play the audio), send the audio to another zone player for reproduction, or both where the audio is reproduced by the zone player as well as one or more additional zone players (possibly in synchrony). In some embodiments, the zone player may play a first audio content (or alternatively, may not play the content at all), while sending a second, different audio content to another zone player(s) for reproduction.

By way of illustration, SONOS, Inc. of Santa Barbara, Calif. presently offers for sale zone players referred to as a "PLAY:5," "PLAY:3," "PLAYBAR," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 3A, 3B, and 3C or to the SONOS product offerings. For example, a zone player may include a wired or wireless headphone. In yet another example, a zone player might include a sound bar for television. In yet another example, a zone player may include or interact with a docking station for an Apple iPod™ or similar device.

2. Example Controllers

Figure 4:
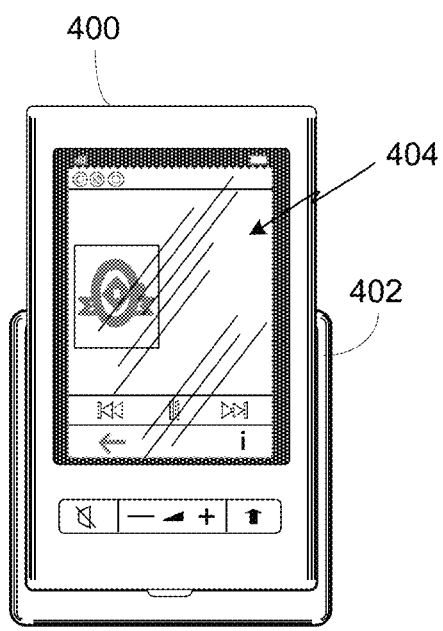
FIG. 4 shows an illustration of an example controller.

FIG. 4 illustrates an example wireless controller 400 in a docking station 402. By way of illustration, the controller 400 may correspond to the controller 230 of FIG. 2. The docking station 402, if provided or used, may provide power to the controller 400 and additionally may charge a battery of the controller 400. In some embodiments, the controller 400 may be provided with a touch screen 404 that allows a user to interact through touch with the controller 400, for example, to retrieve and navigate a playlist of audio items, modify and/or clear the playback queue of one or more zone players, control other operations of one or more zone players, and provide overall control of the media playback system 200. In other embodiments, other input mechanisms such as voice control may be used to interact with the controller 400. In certain embodiments, any number of controllers can be used to control the media playback system 200. In some embodiments, there may be a limit set on the number of controllers that can control the media playback system 200. The controllers might be wireless like the wireless controller 400 or wired to the data network 228.

In some embodiments, if more than one controller is used in the media playback system 200 of FIG. 2, each controller may be coordinated to display common content, and may all be dynamically updated to indicate changes made to the media playback system 200 from a single controller. Coordination can occur, for instance, by a controller periodically requesting a state variable directly or indirectly from one or more of the zone players; the state variable may provide information about the media playback system 200, such as current zone group configuration, what is playing in one or more zones, volume levels, and other items of interest. The state variable may be passed around on the data network 228 between zone players (and controllers, if so desired) as needed or as often as programmed.

In addition, an application running on any network-enabled portable device, such as an iPhone™, iPad™, Android™ powered phone or tablet, or any other smart phone or network-enabled device can be used as the controller 230. An application running on a laptop or desktop personal computer (PC) or Mac™ can also be used as the controller 230. Such controllers may connect to the media playback system 200 through an interface with the data network 228, a zone player, a wireless router, or using some other configured connection path. Example controllers offered by Sonos, Inc. of Santa Barbara, Calif. include a "Controller 200," "SONOS® CONTROL," "SONOS® Controller for iPhone™," "SONOS® Controller for iPad™," "SONOS® Controller for Android™," "SONOS® Controller for Mac™ or PC."

3. Example Data Connection

The zone players 202-224 of FIG. 2 may be coupled directly or indirectly to a data network, such as data network 228. The controller 230 may also be coupled directly or indirectly to the data network 228 or individual zone players. The data network 228 is represented by an octagon in the figure to stand out from other representative components. While the data network 228 is shown in a single location, it is understood that such a network is distributed in and around the media playback system 200. Particularly, the data network 228 can be a wired network, a wireless network, or a combination of both wired and wireless networks. In some embodiments, one or more of the zone players 202-224 may be wirelessly coupled to the data network 228 based on a proprietary mesh network. In some embodiments, one or more of the zone players may be coupled to the data network 228 using a centralized access point such as a wired or wireless router. In some embodiments, one or more of the zone players 202-224 may be coupled via a wire to the data network 228 using Ethernet or similar technology. In addition to the one or more zone players 202-224 connecting to the data network 228, the data network 228 can further allow access to a WAN, such as the WAN 140 of FIG. 1A.

In some embodiments, connecting any of the zone players 202-224, or some other connecting device, to a broadband router, may create the data network 228. Other of the zone players 202-224 may then be added wired or wirelessly to the data network 228. For example, a zone player (e.g., any of the zone players 202-224) can be added to the media playback system 200 by simply pressing a button on the zone player itself (or perform some other action), which enables a connection to be made to the data network 228. The broadband router can be connected to an Internet Service Provider (ISP), for example. The broadband router can be used to form another data network within the media playback system 200, which can be used in other applications (e.g., web surfing). The data network 228 can also be used in other applications, if so programmed. An example second network may implement SONOSNET™ protocol, developed by SONOS, Inc. of Santa Barbara. SONOS-NET™ represents a secure, AES-encrypted, peer-to-peer wireless mesh network. Alternatively, in certain embodiments, the data network 228 may be the same network, such as a traditional wired or wireless network, used for other applications in the household.

4. Example Zone Configurations

A particular zone can contain one or more zone players. For example, the family room of FIG. 2 contains the two zone players 206 and 208, while the kitchen is shown with the one zone player 202. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via the controller 230. As such, zones may be created, combined with another zone, removed, and given a specific name (e.g., "Kitchen"), if so desired and programmed to do so with the controller 230. Moreover, in some embodiments, zone configurations may be dynamically changed even after being configured using the controller 230 or some other mechanism.

In some embodiments, a "bonded zone" contains two or more zone players, such as the two zone players 206 and 208 in the family room, whereby the two zone players 206 and 208 can be configured to play the same audio source in synchrony. In one example, the two zone players 206 and 208 can be paired to play two separate sounds in left and right channels, for example. In other words, the stereo effects of a sound can be reproduced or enhanced through the two zone players 206 and 208, one for the left sound and the other for the right sound. In another example two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player has additional speaker drivers from which sound can be passed. The consolidated zone player can further be paired with a single zone player or yet another consolidated zone player. Each playback device of a consolidated playback device can be set in a consolidated mode, for example.

In certain embodiments, paired zone players (also referred to as "bonded zone players") can play audio in synchrony with other zone players in the same or different zones.

According to some embodiments, one can continue to do any of: group, consolidate, and pair zone players, for example, until a desired configuration is complete. The actions of grouping, consolidation, and pairing are preferably performed through a control interface, such as using the controller 230, and not by physically connecting and re-connecting speaker wire, for example, to individual, discrete speakers to create different configurations. As such, certain embodiments described herein provide a more flexible and dynamic platform through which sound reproduction can be offered to the end-user.

5. Example Audio Sources

In some embodiments, each zone can play from the same audio source as another zone or each zone can play from a different audio source. For example, someone can be grilling on the patio and listening to jazz music via the zone player 224, while someone is preparing food in the kitchen and listening to classical music via the zone player 202. Further, someone can be in the office listening to the same jazz music via the zone player 210 that is playing on the patio via the zone player 224. In some embodiments, the jazz music played via the zone players 210 and 224 may be played in synchrony. Synchronizing playback amongst zones allows for an individual to pass through zones while seamlessly (or substantially seamlessly) listening to the audio. Further, zones can be put into a "party mode" such that all associated zones will play audio in synchrony.

Sources of audio content that may be played by the zone players 202-224 are numerous. In some embodiments, audio on a zone player itself may be accessed and played. In some embodiments, audio on a controller may be accessed via the data network 228 and played. In some embodiments, music from a personal library stored on a computer or networked-attached storage (NAS) may be accessed via the data network 228 and played. In some embodiments, Internet radio stations, shows, and podcasts may be accessed via the data network 228 and played. Music or cloud services that let a user stream and/or download music and audio content may be accessed via the data network 228 and played. Further, music may be obtained from traditional sources, such as a turntable or CD player, via a line-in connection to a zone player, for example. Audio content may also be accessed using a different protocol, such as Airplay™ which is a wireless technology by Apple, Inc., for example. Audio content received from one or more sources can be shared amongst the zone players 202 to 224 via the data network 228 and/or the controller 230. The above-disclosed sources of audio content are referred to herein as network-based audio information sources. However, network-based audio information sources are not limited thereto.

In some embodiments, the example home theater zone players 216, 218, 220 are coupled to an audio information source such as a television 232. In some examples, the television 232 may be used as a source of audio for the home theater zone players 216, 218, 220, while in other examples audio information from the television 232 may be shared with any of the zone players 202-224 in the media playback system 200.

IV. Example Zone Players

Figure 5:
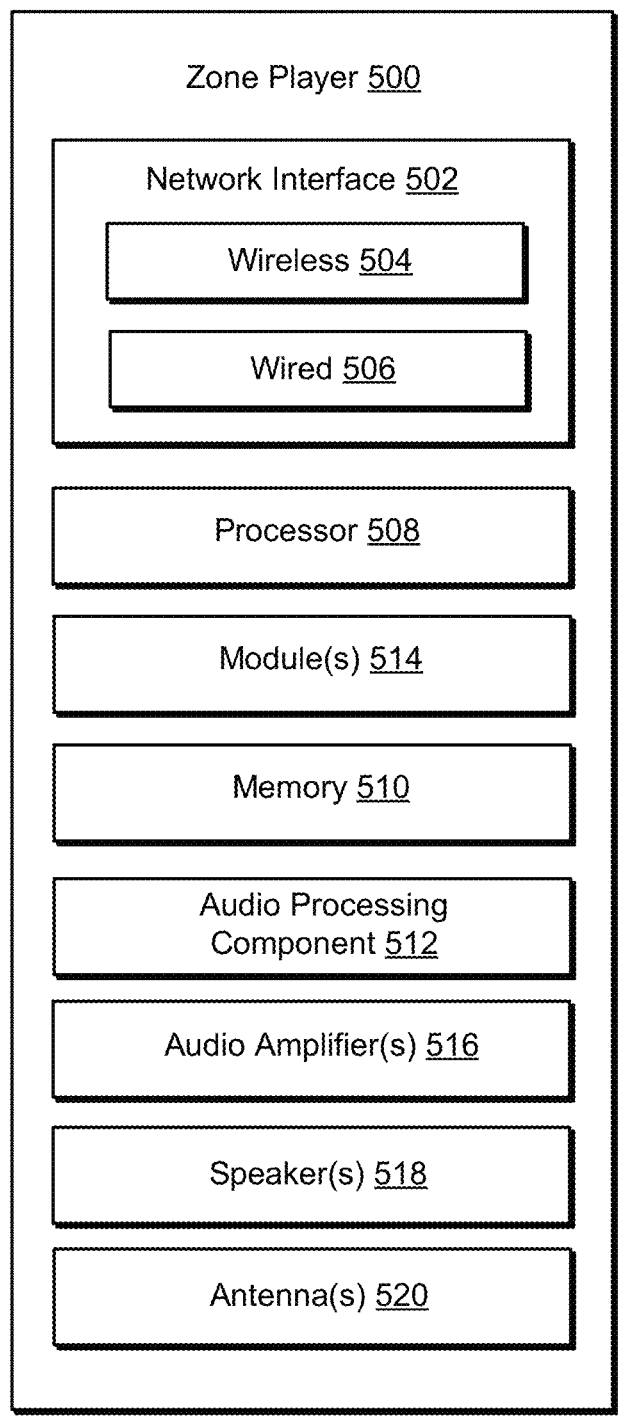
FIG. 5 shows an internal functional block diagram of an example zone player.

Referring now to FIG. 5, there is shown an example block diagram of a zone player 500 in accordance with an embodiment. The zone player 500 may include a network interface 502, at least one processor 508, a memory 510, an audio processing component 512, one or more software modules 514, an audio amplifier 516, a speaker unit 518 coupled to the audio amplifier 516, at least one battery 530, and a power interface 535. FIG. 3A shows an example illustration of such a zone player. Other types of zone players may not include the speaker unit 518 (e.g., such as shown in FIG. 3B) or the audio amplifier 516 (e.g., such as shown in FIG. 3C). Further, it is contemplated that the zone player 500 can be integrated into another component. For example, the zone player 500 could be constructed as part of a television, lighting, or some other device for indoor or outdoor use.

In some embodiments, the network interface 502 facilitates a data flow between the zone player 500 and other devices on the data network 228. In some embodiments, in addition to getting audio from another zone player or device on the data network 228, the zone player 500 may access audio directly from the audio source, such as over a WAN (e.g., the WAN 140) or on the local network. In some embodiments, the network interface 502 can further handle the address part of each packet so that it gets to the right destination or intercepts packets destined for the zone player 500. Accordingly, in certain embodiments, each of the packets includes an Internet Protocol (IP)-based source address as well as an IP-based destination address.

In some embodiments, the network interface 502 can include one or both of a wireless interface 504 and a wired interface 506. The wireless interface 504, also referred to as a radio frequency (RF) interface, provides network interface functions for the zone player 500 to wirelessly communicate with other devices (e.g., other zone player(s), speaker(s), receiver(s), component(s) associated with the data network 228, and so on) in accordance with a communication protocol (e.g., any wireless standard including IEEE 802.11a, 802.11b, 802.11g, 802.11n, 802.11ac, 802.15, 4G mobile communication standard, and so on). The wireless interface 504 may include one or more radios. To receive wireless signals and to provide the wireless signals to the wireless interface 504 and to transmit wireless signals, the zone player 500 includes one or more antennas 520. The wired interface 506 provides network interface functions for the zone player 500 to communicate over a wire with other devices in accordance with a communication protocol (e.g., IEEE 802.3). In some embodiments, a zone player may include multiple wireless 504 interfaces. In some embodiments, a zone player may include multiple wired 506 interfaces. In some embodiments, a zone player may include both of the interfaces 504 and 506. In some embodiments, a zone player may include only the wireless interface 504 or the wired interface 506.

In some embodiments, the at least one processor 508 is a clock-driven electronic device that is configured to process input data according to instructions stored in the memory 510. The memory 510 is data storage that can be loaded with the one or more software modules 514, which can be executed by the at least one processor 508 to achieve certain tasks. In the illustrated embodiment, the memory 510 is a tangible machine-readable medium storing instructions that can be executed by the at least one processor 508. In some embodiments, a task might be for the zone player 500 to retrieve audio data from another zone player or a device on a network (e.g., using a uniform resource locator (URL) or some other identifier). In some embodiments, a task may be for the zone player 500 to send audio data to another zone player or device on a network. In some embodiments, a task may be for the zone player 500 to synchronize playback of audio with one or more additional zone players. In some embodiments, a task may be to pair the zone player 500 with one or more zone players to create a multi-channel audio environment. Additional or alternative tasks (e.g., those discussed below) can be achieved via the one or more software modules 514 and the at least one processor 508.

The audio processing component 512 can include one or more digital-to-analog converters (DAC), an audio preprocessing component, an audio enhancement component or a digital signal processor, and so on. In some embodiments, the audio processing component 512 may be part of the at least one processor 508. In some embodiments, the audio that is retrieved via the network interface 502 may be processed and/or intentionally altered by the audio processing component 512. Further, the audio processing component 512 can produce analog audio signals. The processed analog audio signals may then be provided to the audio amplifier 516 for playback through the speaker unit 518. In addition, the audio processing component 512 can include circuitry to process analog or digital signals as inputs to play from the zone player 500, send to another zone player on a network, or both play and send to another zone player on the network. An example input includes a line-in connection (e.g., an auto-detecting 3.5 mm audio line-in connection).

The audio amplifier 516 is a device(s) that amplifies audio signals to a level for driving one or more speakers of the speaker unit 518. The one or more speakers 518 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

A commercial example, presently known as the PLAY: 5™, is a zone player with a built-in amplifier and speakers that is capable of retrieving audio directly from the source, such as on the Internet or on the local network, for example. In particular, the PLAY:5™ is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies but from different channels of audio. Audio from Internet radio stations, online music and video services, downloaded music, analog audio inputs, television, DVD, and so on, can be played from the PLAY:5™.

V. Example Controller

Figure 6:
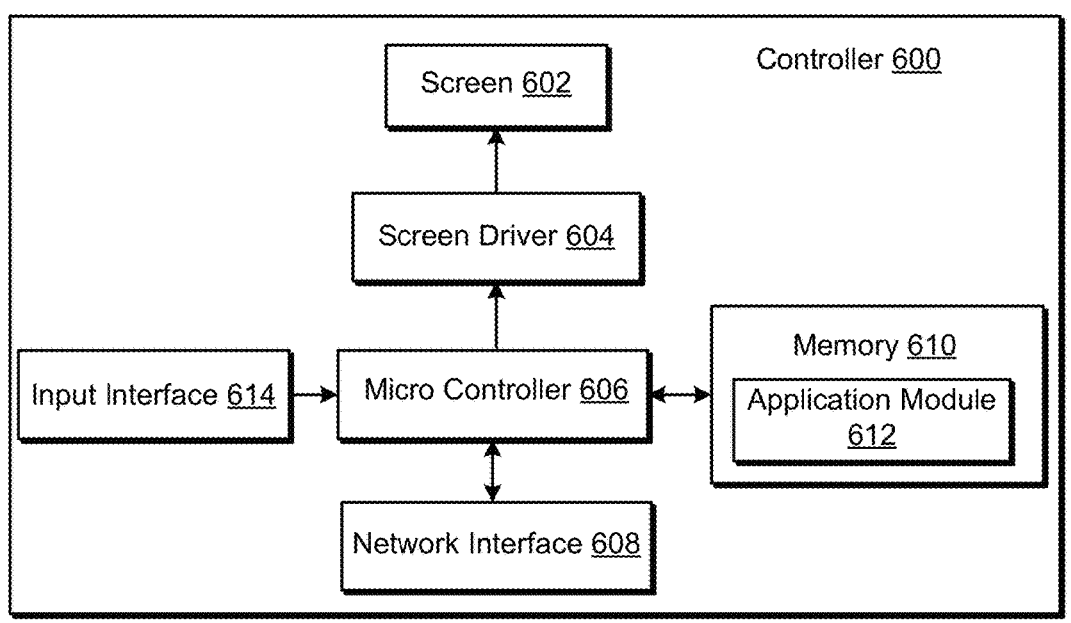
FIG. 6 shows an internal functional block diagram of an example controller.

Referring now to FIG. 6, there is shown an example block diagram for a controller 600, which can correspond to the controller 230 in FIG. 2. The controller 600 can be used to facilitate the control of multi-media applications, automation and others in a system. In particular, the controller 600 may be configured to facilitate a selection of a plurality of audio sources available on the data network 228 and enable control of one or more zone players (e.g., the zone players 202-224 in FIG. 2) through a wireless or wired network interface 608. According to one embodiment, the wireless communications may be based on an industry standard (e.g., infrared, radio, wireless standards including IEEE 802.11a, 802.11b, 802.11g, 802.11n, 802.11ac, 802.15, 4G mobile communication standard, and so on). Further, when a particular audio is being accessed via the controller 600 or being played via a zone player, a picture (e.g., album art) or any other data, associated with the audio and/or audio source can be transmitted from a zone player or other electronic device to the controller 600 for display.

The controller 600 may be provided with a screen 602 and an input interface 614 that may allow a user to interact with the controller 600, for example, to navigate a playlist of media items and to control operations of one or more zone players. The screen 602 on the controller 600 can be an LCD screen, for example. The screen 600 communicates with and is commanded by a screen driver 604 that is controlled by a microcontroller (e.g., a processor) 606. The controller memory 610 can be loaded with one or more application modules 612 that can be executed by the microcontroller 606 with or without a user input via the user interface 614 to achieve certain tasks. In some embodiments, the application module 612 may be configured to facilitate grouping a number of selected zone players into a zone group to facilitate synchronized playback amongst the zone players in the zone group. In some embodiments, the application module 612 may be configured to control the audio sounds (e.g., volume) of the zone players in a zone group. In operation, when the microcontroller 606 executes one or more of the application modules 612, the screen driver 604 may generate control signals to drive the screen 602 to display an application specific user interface accordingly.

The controller 600 includes a network interface 608 that may facilitate wired or wireless communication with a zone player. In some embodiments, the commands such as volume control and audio playback synchronization may be sent via the network interface 608. In some embodiments, a saved zone group configuration may be transmitted between a zone player and a controller via the network interface 608. The controller 600 can control one or more zone players, such as the zone players 202-224 of FIG. 2. There can be more than one controller for a particular system, and each controller may share common information with another controller, or retrieve the common information from a zone player, if such a zone player stores configuration data (e.g., such as a state variable). Further, a controller can be integrated into a zone player.

It should be noted that other network-enabled devices such as an iPhone™, iPad™ or any other smartphone or network-enabled device (e.g., a networked computer such as a PC or Mac™) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 600. The zone players in the zone group can play audio in a synchronized fashion, such that all of the zone players in the zone group playback an identical audio source or a list of identical audio sources in a synchronized manner such that no (or substantially no) audible delays or hiccups are to be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 600 can group zone players into a zone group by activating a "Link Zones" or "Add Zone" soft button, or de-grouping a zone group by activating an "Unlink Zones" or "Drop Zone" button. For example, one mechanism for 'joining' zone players together for audio playback is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer. In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would manually and individually link each zone. The single command may include a mouse click, a double mouse click, a button press, a gesture, or some other programmed or learned action. Other kinds of zone scenes can be programmed or learned by the system over time.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration and revert the zones to their prior configuration. Although any particular zone can be triggered to an "On" or "Off" state based on time, for example, a zone scene enables any zone(s) linked to the scene to play a predefined audio (e.g., a favorable song, a predefined playback queue) at a specific time and/or for a specific duration. If, for any reason, the scheduled music failed to be played (e.g., an empty playback queue, no connection to a share, failed Universal Plug and Play (UPnP), no Internet connection for an Internet Radio station, and so on), a backup buzzer can be programmed to sound. The buzzer can include a sound file that is stored in a zone player, for example.

VI. Playback Queue

As discussed above, in some embodiments, a media playback system may be associated with one or more playback queues that identify one or more media items for playback by the media playback system. The media items identified in a playback queue may be represented to a user via an interface on a controller (e.g., the controller 130) or other computing device (e.g., the computing devices 120-124). A playback queue that is displayed to a user may be referred herein as a playlist.

Each item in a playback queue may be represented on an interface by an element such as, for example, a media-item title, an artist name, an album title, an album art, a streaming data source name (e.g., an Internet radio station name), or other such representation. Further, the playlist may indicate how the media playback system is traversing the playback queue, such as by highlighting the "now playing" item, graying out the previously played item(s), highlighting the to-be-played item(s), and so on.

A playback queue of a media playback system may be created (populated) and/or modified via a local device within the media playback system (e.g., the controller 230) or a remote device/system (e.g., the media system server 130). In a local creation of a playback queue, a user of a local device may populate the playback queue with media items of interest, for example, by selecting media items from a set of media items available for playback by the media playback system. In a remote creation of a playback queue, one or more computing devices (e.g., the computing devices 120-124) may transmit selection data to a media system server (e.g., the media system server 130). The selection data may indicate a selection of a particular media item from the set of media items to be added to the playback queue of a particular media playback system. The media system server may then populate the playback queue according to the selections.

In implementations that involve a remote creation, a media system server (e.g., the media system 130) may transmit one or more playback queues to a media playback system (e.g., the media playback system 110) via one or more data networks (e.g., the WAN 140). Remote creation of playback queues is discussed in further detail below.

In some embodiments, a single zone player is assigned to a playback queue. For example, zone player 214 in the bathroom of FIG. 2 may be linked or assigned to a "Bathroom" playback queue. In an embodiment, the "Bathroom" playback queue might have been established by the system as a result of the user naming the zone player 214 to the bathroom. As such, contents populated and identified in the "Bathroom" playback queue can be played via the zone player 214 (the bathroom zone).

In some embodiments, a zone or zone group is assigned to a playback queue. For example, zone players 206 and 208 in the family room of FIG. 2 may be linked or assigned to a "Family room" playback queue. In another example, if family room and dining room zones were grouped, then the new group would be linked or assigned to a family room+dining room playback queue. In some embodiments, the family room+dining room playback queue would be established based upon the creation of the group. In some embodiments, upon establishment of the new group, the family room+dining room playback queue can automatically include the contents of one (or both) of the playback queues associated with either the family room or dining room or both. In one instance, if the user started with the family room and added the dining room, then the contents of the family room playback queue would become the contents of the family room+dining room playback queue. In another instance, if the user started with the family room and added the dining room, then the family room playback queue would be renamed to the family room+dining room playback queue. If the new group was "ungrouped," then the family room+dining room playback queue may be removed from the system and/or renamed to one of the zones (e.g., renamed to "family room" or "dining room"). After ungrouping, each of the family room and the dining room will be assigned to a separate playback queue. One or more of the zone players in the zone or zone group may store in memory the associated playback queue.

As such, when zones or zone groups are "grouped" or "ungrouped" dynamically by the user via a controller, the system will, in some embodiments, establish or remove/rename playback queues respectively, as each zone or zone group is to be assigned to a playback queue. In other words, the playback queue operates as a container that can be populated with media items for playback by the assigned zone. In some embodiments, the media items identified in a playback queue can be manipulated (e.g., re-arranged, added to, deleted from, and so on).

VII. Example Ad-Hoc Network

Figure 7:
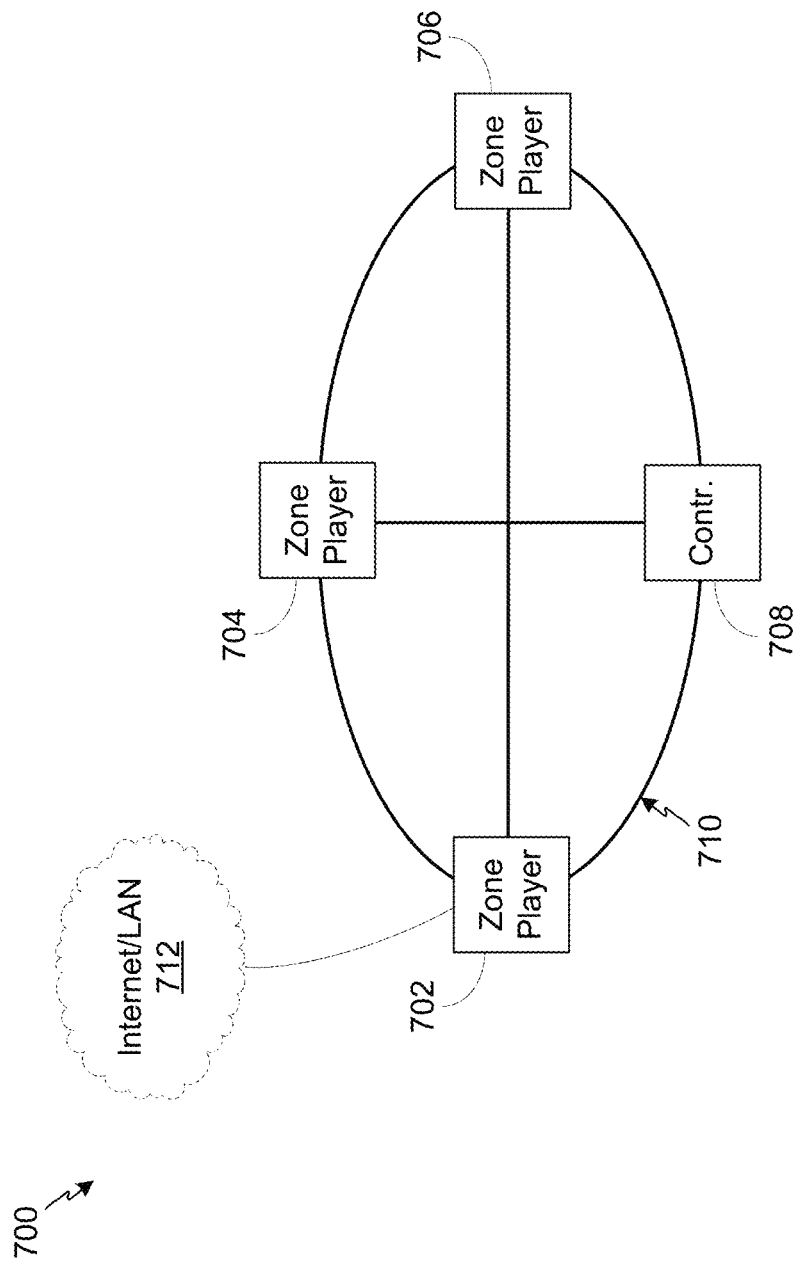
FIG. 7 shows an example ad-hoc playback network.

Particular examples are now provided in connection with FIG. 7 to describe, for purposes of illustration, certain embodiments to provide and facilitate connection to a media playback network. FIG. 7 shows that there are three zone players 702, 704 and 706 and a controller 708 that form a network branch that is also referred to as an Ad-Hoc network 710. The Ad-Hoc network 710 may be wireless, wired, or a combination of wired and wireless technologies. In general, an Ad-Hoc (or "spontaneous") network is a local area network or other small network in which there is generally no one access point for all traffic. With an established Ad-Hoc network 710, the devices 702, 704, 706 and 708 can all communicate with each other in a "peer-to-peer" style of communication, for example. Furthermore, devices may join and/or leave from the Ad-Hoc network 710, and the Ad-Hoc network 710 will automatically reconfigure itself without needing the user to reconfigure the Ad-Hoc network 710. While an Ad-Hoc network is referenced in FIG. 7, it is understood that a playback network may be based on a type of network that is completely or partially different from an Ad-Hoc network (e.g., a mesh network).

Using the Ad-Hoc network 710, the devices 702, 704, 706, and 708 can share or exchange one or more audio sources and be dynamically grouped (or ungrouped) to play the same or different audio sources. For example, the zone players 702 and 704 may be grouped to playback one piece of music, and at the same time, the zone player 706 may playback another piece of music. In other words, the devices 702, 704, 706 and 708, as shown in FIG. 7, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service.

In certain embodiments, a household identifier (HHID) is a short string or an identifier that is computer-generated to help ensure that it is unique. Accordingly, the Ad-Hoc network 710 can be characterized by a unique HHID and a unique set of configuration variables or parameters, such as channels (e.g., respective frequency bands), service set identifier (SSID) (a sequence of alphanumeric characters as a name of a wireless network), and WEP keys (wired equivalent privacy) or other security keys. In certain embodiments, SSID is set to be the same as HHID.

In certain embodiments, each HOUSEHOLD may include two types of network nodes: a control point (CP) and a zone player (ZP). The CP controls an overall network setup process and sequencing, including an automatic generation of required network parameters (e.g., security keys). In an embodiment, the CP also provides the user with a HOUSEHOLD configuration user interface. The CP function can be provided by a computer running a CP application module, or by a handheld controller (e.g., the controller 708) also running a CP application module, for example. The ZP is any other device on the network that is placed to participate in the automatic configuration process. In certain embodiments, the ZP, as a notation used herein, may include the controller 708 or a computing device, for example. In some embodiments, the functionality, or certain parts of the functionality, in both the CP and the ZP may be combined at a single node (e.g., a ZP contains a CP or vice-versa).

In certain embodiments, HOUSEHOLD configuration may involve multiple CPs and ZPs that rendezvous and establish a known configuration such that they can use a standard networking protocol (e.g., IP over Wired or Wireless Ethernet) for communication. In an embodiment, two types of networks/protocols may be employed: Ethernet 802.3 and Wireless 802.11g. Interconnections between a CP and a ZP can use either of the networks/protocols. A device in the system as a member of a HOUSEHOLD can connect to both networks simultaneously.

In an environment that has both networks in use, it is assumed that at least one device in a system is connected to both as a bridging device, thus providing bridging services between wired/wireless networks for others. The zone player 702 in FIG. 7 is shown to be connected to both networks, for example. The connectivity to the network 712 may be based on Ethernet and/or Wireless, while the connectivity to other devices 702, 704 and 708 may be based on Wireless and Ethernet if so desired.

It is understood, however, that in some embodiments each zone player 702-706 may access the Internet when retrieving media from the cloud (e.g., the Internet) via the bridging device. For example, the zone player 702 may contain a uniform resource locator (URL) that specifies an address to a particular audio track in the cloud. Using the URL, the zone player 702 may retrieve the audio track from the cloud, and ultimately play the audio out of one or more of the other zone players.

VIII. Methods for Remote Creation of a Playback Queue

As discussed above, a media playback system may be associated with a playback queue, and in some situations, it may be desirable to remotely create and/or modify the playback queue.

Figure 8:
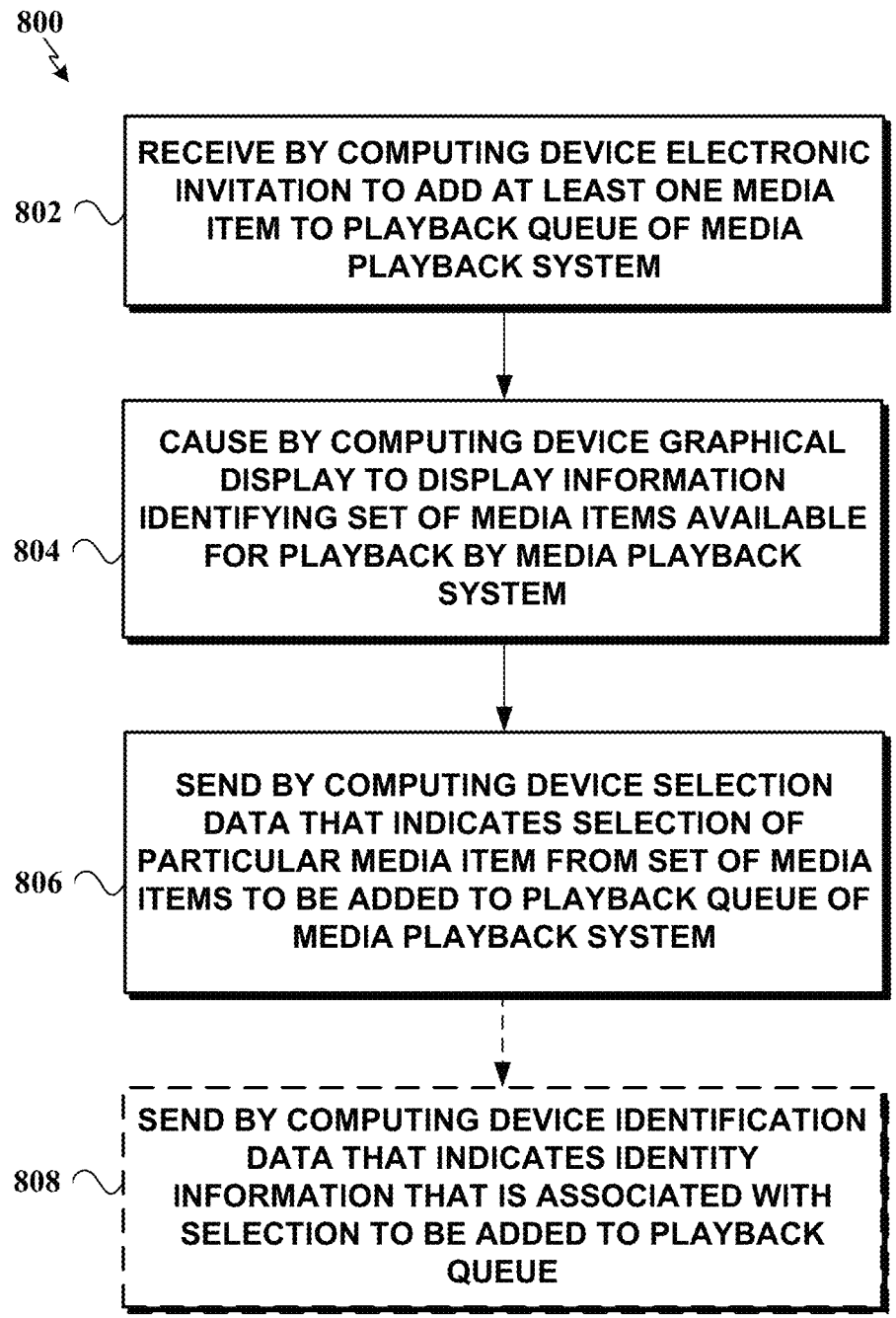
FIGS. 8 and 9 show flowcharts of example methods, according to example embodiments.
Figure 9:
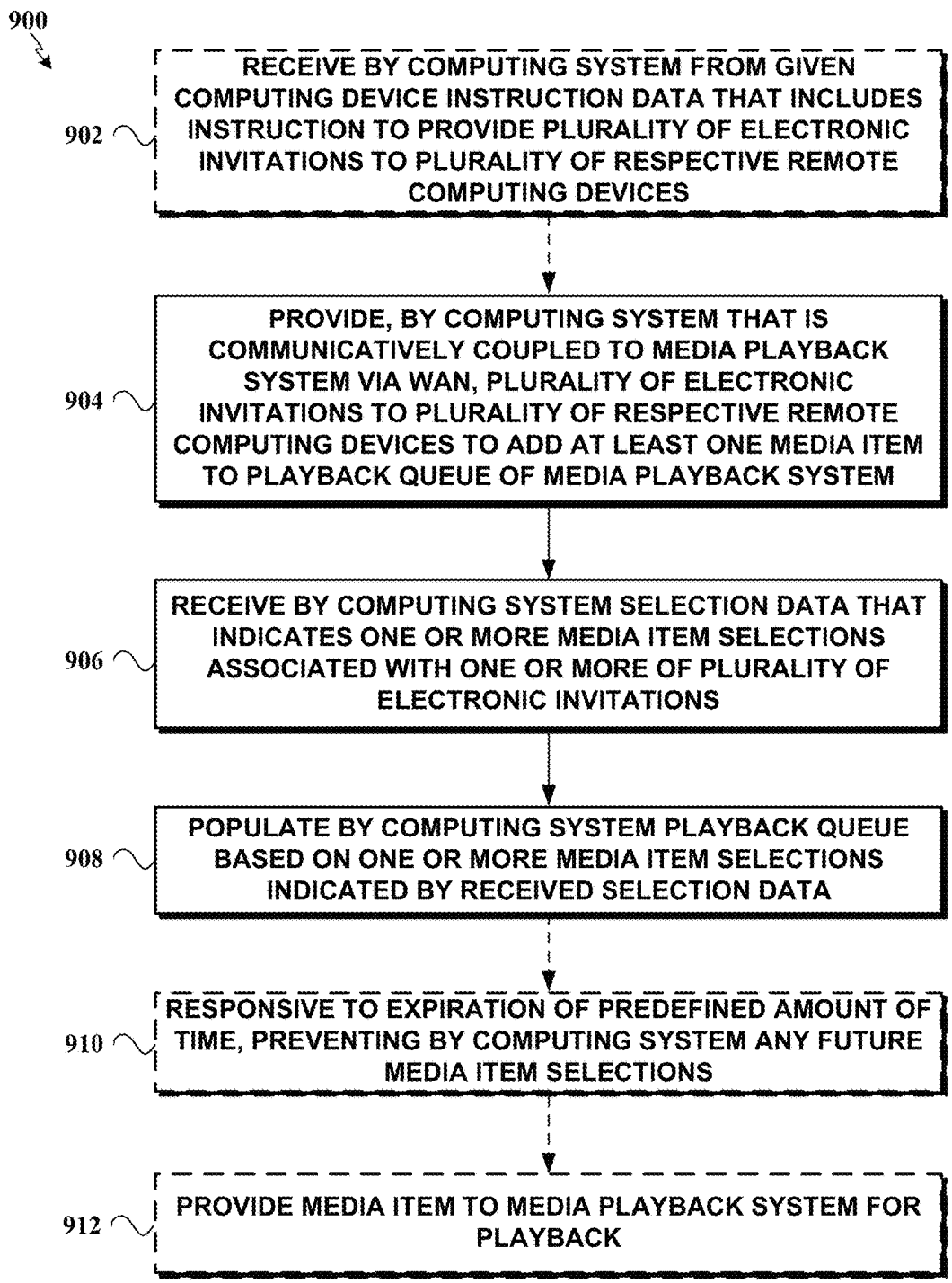

FIGS. 8 and 9 are flowcharts that depict example methods for remotely creating a playback queue. The example methods may be carried out on the network configuration 100, but it should be understood that the methods may be carried out on other suitable network configurations as well. It should be understood that some or all of the blocks of methods 800 and methods 900 may be performed simultaneously and/or sequentially.

For clarity, the methods are described herein with reference to FIGS. 10A-10D, which depict example displays provided by a graphical display of a computing device, according to the example methods. It should be understood, however, that this is for purposes of example and explanation only and that various other example displays are certainly possible.

Furthermore, those skilled in the art will understand that the flowcharts described herein depict functionality and operation of certain implementations of example embodiments. In this regard, each block of each flowchart may represent a module, a segment, or a portion of program code, which includes one or more instructions executable by a processor for implementing specific logical functions or steps in the process. The program code may be stored on any type of computer readable medium, e.g., such as a storage device including a disk or hard drive. In addition, each block may represent circuitry that is wired to perform the specific logical functions in the process. Alternative implementations are included within the scope of the example embodiments of the present application in which functions may be executed out of order from that shown or discussed, including substantially concurrent or in reverse order, depending on the functionality involved, as would be understood by those skilled in the art.

1. First Example Method

FIG. 8 illustrates a method 800 for remotely creating a playback queue of a media playback system, according to example embodiments. The method 800 may be carried out by a computing device (e.g., any of the computing devices 120-124 of FIG. 1A). For purposes of example and explanation only, the method 800 will be described as being carried out by the computing device 120.

The method 800 may begin at block 802 with receiving by a computing device an electronic invitation to add at least one media item to a playback queue of a media playback system, where the electronic invitation includes a link to access information identifying a set of media items available for playback by the media playback system, and where the computing device and the media playback system are communicatively coupled via at least a WAN. At block 804, the method 800 may involve causing by the computing device a graphical display to display the information identifying the set of media items available for playback by the media playback system. At block 806, the method 800 may involve sending by the computing device selection data that indicates a selection of a particular media item from the set of media items to be added to the playback queue of the media playback system. At block 808, the method 800 may optionally or additionally involve sending by the computing device annotation data that indicates annotation information that is associated with the selection to be added to the playback queue. Each of the blocks shown with respect to FIG. 8 is discussed further below.

a. Receiving Electronic Invitation

The method 800 may begin at block 802 with receiving by a computing device an electronic invitation to add at least one media item to a playback queue of a media playback system, where the electronic invitation includes a link to access information identifying a set of media items available for playback by the media playback system, and where the computing device and the media playback system are communicatively coupled via at least a WAN. In example implementations, receiving the electronic invitation may involve the computing device 120 receiving the electronic invitation from the media system server 130 via the WAN 140.

The electronic invitation may take several forms. For example, the electronic invitation may be an email, a text message (e.g., a SMS or MMS message), or a social media communication, among other possibilities.

Broadly speaking, the electronic invitation may include a request for the invitation recipient to attend an event at a future date and to, prior to the event, add media items to a playback queue that may be played at the event by a media playback system (e.g., the media playback system 110). The electronic invitation may include request data that indicates a request for the invitation recipient to add at least one media item to the playback queue. The request data may be text data, video data, and/or audio data that when output by the computing device 120 indicates a request that the invitation recipient add at least one media item to the playback queue.

The electronic invitation may further include a link that provides access to the information identifying a set of media items available for playback by the media playback system. For example, the link may provide access to certain data from the database 131 of FIG. 1B that is associated with the media playback system 110.

In example implementations, the link may include a uniform resource locator (URL) that identifies a particular resource (e.g., the media system server 130) that is associated with the electronic invitation and that stores the information identifying the set of media items. The URL may additionally or alternatively identify an Internet location of the particular resource. In some implementations, the link may be a hyperlink that is configured to direct the computing device 120 to the particular resource upon a user input indicating a selection of the hyperlink.

Further, the link may be configured such that tracking data may be sent to the particular resource when the link is accessed. The particular resource may use the tracking data to identify the number of users accessing the URL. Additionally or alternatively, the particular resource may limit the number of users that may access the URL and use the tracking data to determine whether a predefined threshold has been met. If the threshold has been met, the particular resource may prevent further access to the set of media items. Furthermore, the particular resource may additionally or alternatively limit a user to a threshold number of added media items. Once the particular user meets that threshold, the particular resource may prevent the user from adding any additional media items. Other examples are certainly possible.

In some implementations, the electronic invitation may further include a time element that indicates a time after which media items will not be available to be added to the playback queue. That is, the time element may define the lifetime of the electronic invitation during which invitation recipients may select media items to be added to the playback queue. In one example, the time element may include a countdown timer, and the media items will not be available to be added to the playback queue upon expiration of the countdown timer. In any event, after the time element indicates that the lifetime of the electronic invitation has expired, the link may expire or otherwise become inactive, or user permissions may be altered such that viewing a playlist may be allowed but adding additional media items to the playback queue is not allowed. Other examples are also possible.

Additionally, the electronic invitation may further include a queue profile that defines characteristics of the queue and how the playback queue will be played by the media playback system. The queue profile may include a start time indicating when the media playback system will begin playback of the queue, a play duration indicating a total amount of time that the media playback system will playback media items from the queue, zone groupings, a mood setting, and/or a queue genre. The queue profile might be stored in the database 131.

A mood setting may indicate a playback queue theme that guides or otherwise suggests the type of media items that invitation recipients should add to the playback queue. For example, a mood setting might be "slow romantic", "dance party", or "lights on . . . time to go home", among other examples. The mood setting might transition throughout the queue, or the mood setting might be fixed. For instance, a mood setting might transition from "dance party" to "slow romantic" to "lights on . . . time to go home", which might correspond to the various phases of the event (e.g., a party) where the playback queue will be played.

In some implementations, the mood setting might limit what media items can be added to the playback queue via a "mood filter." The mood filter might filter a media item based on one or more attributes of the media item, such as the genre of the media item or one or more words from the media item title. For example, if the mood setting is "slow romantic", the mood filter might reject the addition of a media item titled "Party Rock." In example implementations, the mood filter might additionally or alternatively filter items based on the underlying content of the media item. For example, if the mood setting is set to "dance party", the mood filter might reject the addition of media items that have a slow-tempo for instance. Other examples are possible as well.

A queue genre may indicate the genre of media items that invitation recipients are permitted to add to the playback queue. For example, the queue genre may be "Country" and thus the invitation recipients may be limited to add only Country media items to the playback queue. Other examples are certainly possible.

Figure 10A:
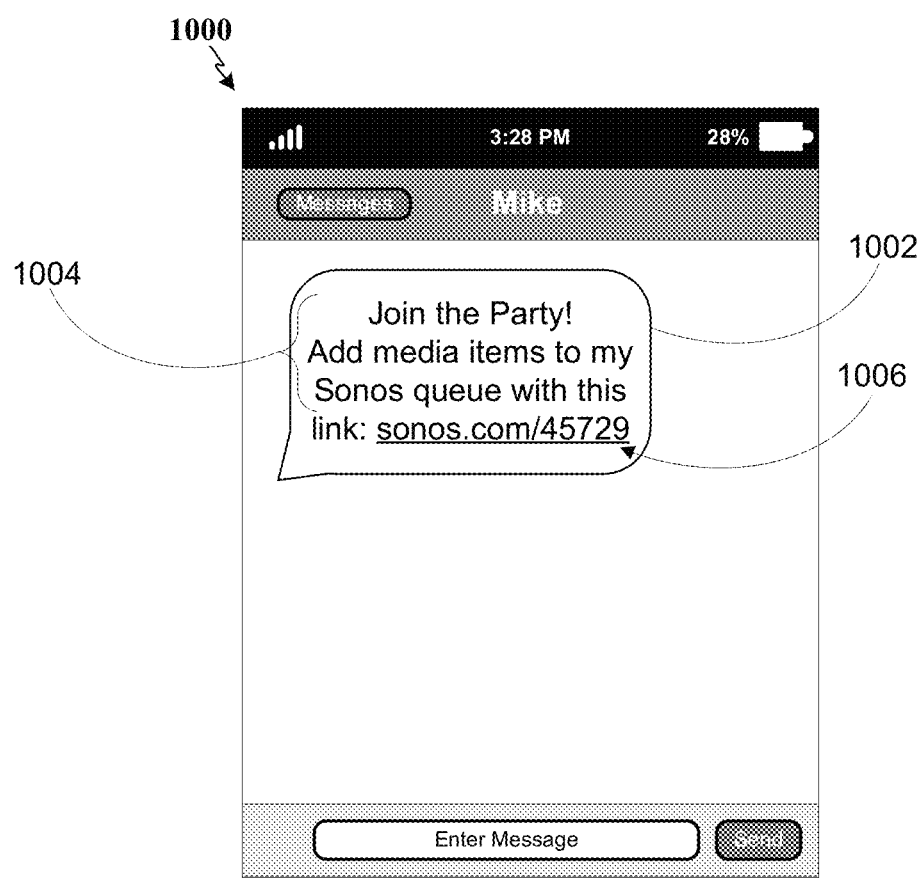
FIGS. 10A, 10B, 10C, and 10D show example displays provided by a graphical display of a computing device, according to the example methods.

Once the electronic invitation is received, the computing device 120 may cause a graphical display of the computing device 120 to display the electronic invitation. FIG. 10A depicts an example graphical display 1000 displaying an example electronic invitation 1002. As depicted, the electronic invitation 1002 is in the form of a text message and includes textual request data 1004 and link 1006. It should be understood that the graphical display 1000 displays but one example of a displayed electronic invitation and should not be construed to be limiting.

b. Causing Graphical Display to Display Information Identifying Media Items Available for Playback At block 804, the method 800 may involve causing by the computing device a graphical display to display the information identifying the set of media items available for playback by the media playback system. The displayed information may be configured to be interactive such that a user may add one or more media items to the playback queue by selecting an aspect of the displayed information.

In some implementations, the information identifying the set of media items may include one or more identifiers that are associated with one or more respective media items from the set of media items. In some examples, the identifiers may include: a media item title, an artist name, an album title, a genre, and a streaming source name, among other identifier types.

In example implementations, causing by the computing device the graphical display to display the information identifying the set of media items may involve causing the graphical display to display the information via a web interface. For example, a web browser may display on the graphical display of the computing device 120 a web page that includes a representation of the set of media items of the media playback system 110. The web page may be used to add media items to a playback queue without requiring the computing device 120 to be configured with an application associated with the media system server 130. As such, the web page may include one or more selectable aspects that are configured to, when selected, allow a user to add a media item to the playback queue.

The web interface may be searchable such that a user may enter search criteria to navigate the set of media items. For example, the web interface may allow a user to search the set of media items by one or more media-item identifiers. Further, the web interface may be configured to display a playlist in real-time as the playback queue is being created and/or modified. The web interface may also be configured to display the playlist after the event. Additionally, the web interface may be configured to permit a user to select one or more media items from a current playback queue and add the selected media items to another playback queue (e.g., a playback queue associated with a different media playback system).

Figure 10B:
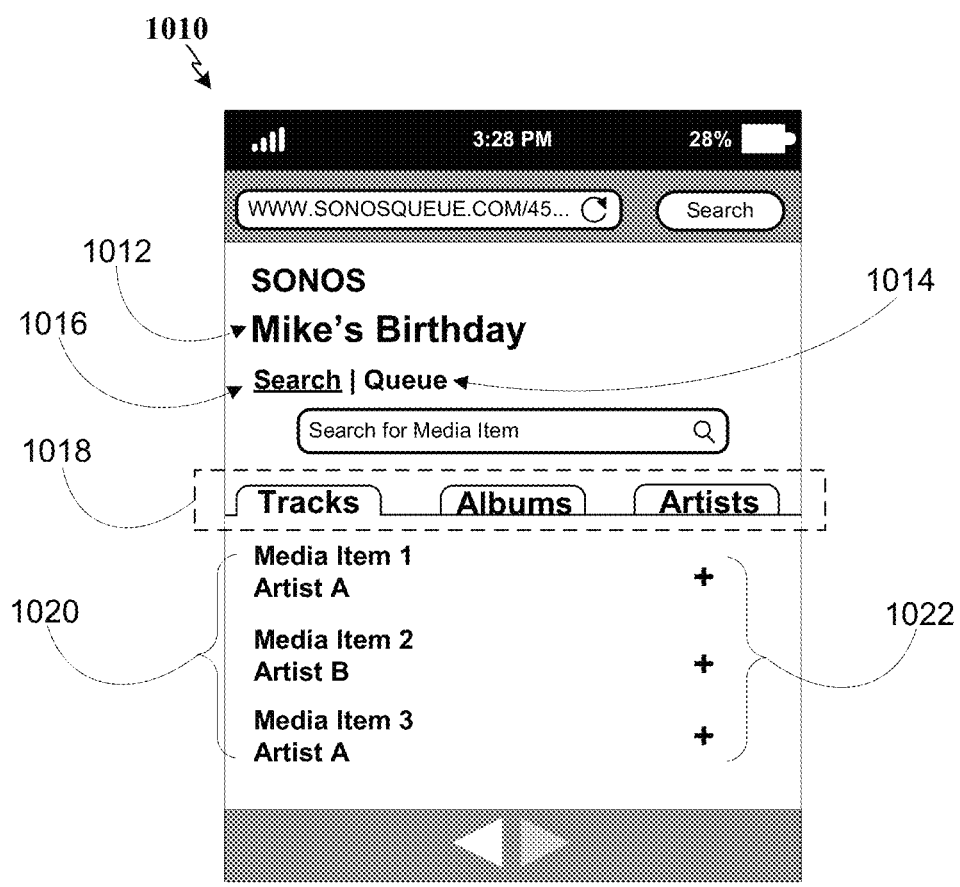

FIG. 10B depicts an example graphical display 1010 displaying an example web interface, according to example embodiments. As shown, the web interface may include a queue name tied to the event 1012, an option to view the media items in the current queue 1014, an option to search the set of media items for available media items 1016 (as shown, this option has been selected), and further options to browse by track (as shown, this option has been selected), album, or artist 1018, among other possibilities. The web interface may also include search results 1020 (e.g., from a browse-by-track search) that may include one or media item titles and respective artists of the respective media items. Each of the displayed media items may also include a respective add-item-to-queue aspect 1022 that, when selected, generates selection data (for sending in accordance with block 806, discussed below) that indicates that the respective media item is to be added to the playback queue.

Figure 10C:
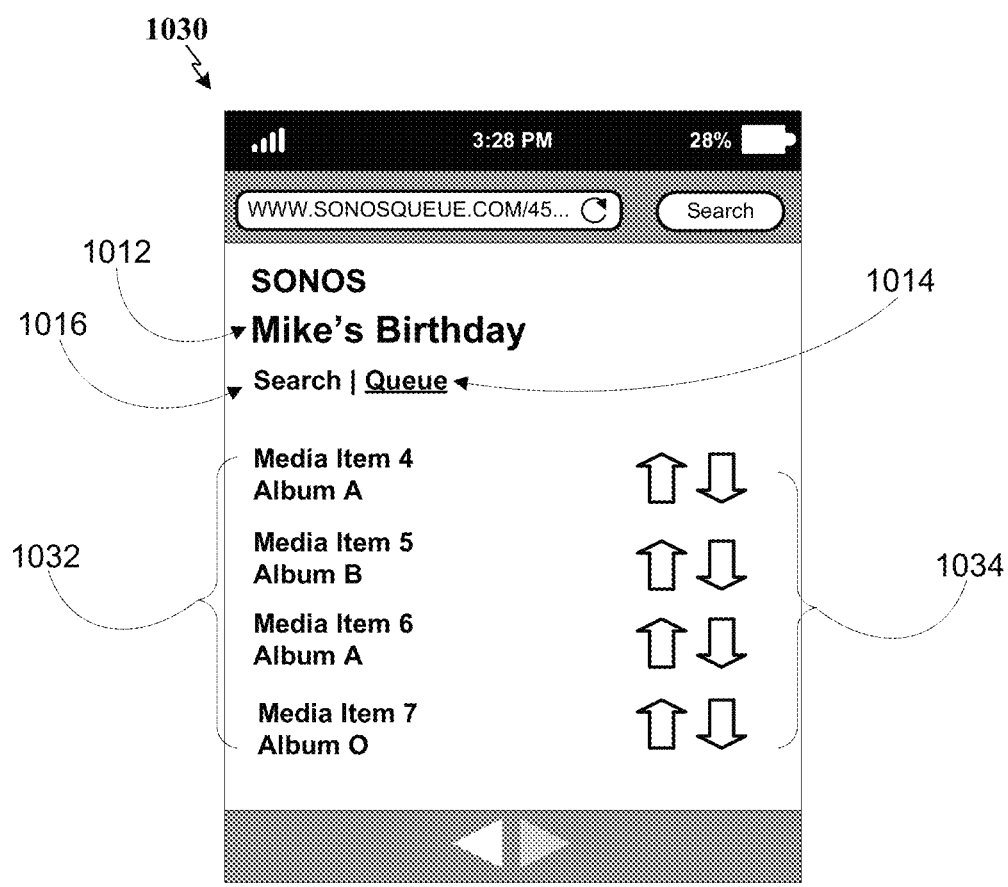

FIG. 10C depicts another graphical display 1030 displaying an example web interface. In example implementations, the web interface may be displayed as a result of a selection of the queue option 1014 from FIG. 10B. As shown, the web interface may include the queue name tied to the event 1012, the option to view the media items in the current queue 1014 (as shown, this option has been selected) the option to search the set of media items for available media items 1016, and the current playlist 1032 that displays the media items currently in the playback queue. Each media item in the current playlist 1032 may include a respective vote aspect 1034 that, when selected, generates vote data (for sending in accordance with block 806, discussed below) that indicates either a vote to move the given media item up or down in the playlist. It should be understood that the graphical displays 1010 and 1030 are but two examples of displays of the information identifying the set of media items and should not be construed as limiting.

Other information may be accessible from the web interface as well. For example, the other information may include event information (e.g., the date, the time, the location, the guest list of the event, etc.), a link to a map or a web page with directions to the event, and/or a link to add annotation information to the media items that a particular user added to the playback queue, among other additional information. The web interface may also be configured to allow a user to provide a comment regarding the event and/or tag an image from the event after the event has occurred.

In some implementations, where the computing device 120 is configured with an application associated with the media system server 130, causing by the computing device the graphical display to display the information identifying the set of media items may involve launching the application and causing the graphical display to display the information via an application interface. The application interface may be configured the same as or similar to the web interface herein described.

In example implementations, causing by the computing device the graphical display to display the information identifying the set of media items may involve receiving link-select data by the computing device that indicates a selection of the link. For example, the computing device 120 may receive input data via an input at an input interface of the computing device 120 that indicates a selection of the link in the electronic invitation.

In some implementations, the web interface may additionally or alternatively provide a mechanism by which a user may search for media items and/or services not currently available for playback by the media playback system and add such media items and/or services to the playback queue. That is, in such an implementation, a user might use the web interface to identify or otherwise suggest a media item for the media playback system to make available for playback.

c. Sending Selection Data

At block 806, the method 800 may involve sending by the computing device selection data that indicates a selection of a particular media item from the set of media items to be added to the playback queue of the media playback system. In example implementations, sending the selection data might involve the computing device 120 sending the selection data to the media system server 130 via the WAN 140.

The selection of the particular media item may involve a selection of a media item title, an artist name, an album title, a genre, a streaming source name, or a selectable aspect associated with any of the former, or any combination thereof. Additionally or alternatively, the selection of the particular media item may involve a selection of a voting aspect associated with the particular media item.

In example implementations, sending by the computing device selection data may involve receiving a selection input by an input interface of the computing device that indicates a selection of one or more media items from the displayed information identifying the set of media items available for playback by the media playback system. For example, referring back to FIG. 10B, a selection input may involve a user selecting one of the add-item-to-queue aspects 1022 via the computing device 120. Or, referring back to FIG. 10C, a selection input may involve a user selecting one of the voting aspects 1034 associated with a media item. The computing device 120 may then send the selection data to the media system server 130 via the WAN 140.

In an implementation where a user may add a media item not currently available for playback by the media playback system, the selection data might include a URL or some other location mechanism that specifies an address to the particular media item not currently available for playback that is located at a resource that is connected to the WAN 140.

d. Sending Annotation Data

At block 808, the method 800 may optionally or additionally involve sending by the computing device annotation data that indicates annotation information that is associated with the selection to be added to the playback queue. Similar to sending the selection data, sending the annotation data might involve the computing device 120 sending the annotation data to the media system server 130 via the WAN 140.

As described above, in certain implementations other information may be accessible from the web interface, such as a link to add annotation information to the media items that a particular user added to the playback queue. That is, in addition to adding a media item to the playback queue, a user may add an annotation to let others know who added the media item and/or why the media item was added for instance. Example annotation information may include a message, an image, a video, and/or a social media status, among other possibilities. When a user adds annotation information to a media item, the computing device 120 may send corresponding annotation data (that indicates the annotation information) that may include message data, image data, and/or video data for example. Other annotation data is also possible.

In certain embodiments, the annotation data may be sent by a computing device during the event (e.g., while a media item is playing). For example, while a media playback system is playing back a media item, a computing device may capture image data and send the image data as annotation data associated with the media item. Other examples are certainly possible.

The annotation information may be displayed at a graphical display (e.g., of one or more of the computing devices 120-126 and/or a controller device of the media playback system 110) when the graphical display is displaying a representation of the media item that the annotation information is associated with. An example of displayed annotation information is discussed below with reference to FIG. 10D.

2. Second Example Method

FIG. 9 illustrates a method 900 for remotely creating a playback queue of a media playback system, according to example embodiments. The method 900 may be carried out by a computing system (e.g., the media system server 130).

The method 900 may optionally begin at block 902 with receiving by a computing system from a given computing device instruction data that includes an instruction to provide a plurality of electronic invitations to a plurality of respective remote computing devices. At block 904, the method 900 may involve providing, by the computing system that is communicatively coupled to a media playback system via a WAN, the plurality of electronic invitations to the plurality of respective remote computing devices to add at least one media item to a playback queue of the media playback system, where each of the plurality of electronic invitations comprises a link to access information identifying one or more media items available for playback by the media playback system. In certain implementations, the method 900 may begin at block 904. At block 906, the method 900 may involve receiving by the computing system selection data that indicates one or more media item selections associated with one or more of the plurality of electronic invitations. At block 908, the method 900 may involve populating by the computing system the playback queue based on the one or more media item selections indicated by the received selection data. At block 910, the method 900 may optionally involve, responsive to the expiration of a predefined amount of time, preventing by the computing system any future media item selections. At block 912, the method 900 may optionally involve providing a media item to the media playback system for playback.

As mentioned above, blocks 902, 910 and 912 are optional. That is, the method 900 may involve blocks 904-908 without any additional blocks, or the method 900 may involve blocks 904-908 and one or more of the optional blocks 902, 910, and 912. Each of the blocks shown with respect to FIG. 9 is discussed further below.

a. Receiving Instruction Data

The method 900 may optionally begin at block 902 with receiving by a computing system from a given computing device instruction data that includes an instruction to provide a plurality of electronic invitations to a plurality of respective remote computing devices. In example embodiments, the media system sever 130 may receive from the computing device 126 instruction data that includes an instruction to provide a plurality of electronic invitations to the remote computing devices 120-124. The instruction data may be based on one or more inputs at an input interface of the computing device 126. A graphical display of the computing device 126 may display prompts for a user to input invitation data to be sent to the plurality of remote computing devices 120-124.

In some embodiments, the given computing device may be associated with a media playback system. As described above with reference to FIG. 1A, the computing device 126 may be associated with the media playback system 110 in that the computing device 126 may control access to a set of media items available for playback by the media playback system 110 and/or associated playback queues. Other associations are also possible.

Generally speaking, the instruction data may include data that indicates the contents of the electronic invitations (e.g., a request to add at least one media item to a playback queue and a link to access the set of media items) and other information related to the event. In particular, the instruction data may include event data that may indicate a time, a date, and/or a location of the event. Further, the instruction data may include invitation data that may indicate a time element of the invitation (e.g., how long recipients may add media items to the playback queue), any queue addition limitations (e.g., a limited or unlimited number of media items each recipient is permitted to add to a playback queue), a queue name tied to the event, and/or a means to share the electronic invitations with the remote computing devices (e.g., via an email, a text message, or a social media network identifier associated with the remote computing devices). It should be understood that the above are just examples of data that the instruction data might include and should not be construed as limiting.

b. Providing Electronic Invitations

At block 904, the method 900 may involve providing, by the computing system that is communicatively coupled to a media playback system via a WAN, the plurality of electronic invitations to the plurality of respective remote computing devices to add at least one media item to a playback queue of the media playback system, where each of the plurality of electronic invitations comprises a link to access information identifying one or more media items available for playback by the media playback system. As noted above, in certain embodiments, the method 900 may begin at block 904.

In example embodiments, the media system server 130 may provide the plurality of electronic invitations to the remote computing devices 120-124 via the WAN 140. Each of the plurality of electronic invitations may include a link to access information identifying the set of media items available for playback by the media playback system 110. The electronic invitation and link may be the same as or similar to the electronic invitation and link discussed above with reference to block 802 of FIG. 8.

c. Receiving Selection Data

At block 906, the method 900 may involve receiving by the computing system selection data that indicates one or more media item selections associated with one or more of the plurality of electronic invitations. In example embodiments, the media system server 130 may receive the selection data from one or more of the computing devices 120-124 via the WAN. The selection data may be the same as or similar to the selection data discussed above with reference to block 806 of FIG. 8. For example, the media system server 130 may receive the selection data after the computing device 120 performs block 806 of FIG. 8.

As discussed above, in some implementations, the selection data may include vote data that indicates an up or down vote for a media item currently in the playback queue. The computing system may also receive annotation information from a remote computing device that is associated with the selection data. For example, the annotation information may include a message, and/or an image, among other possibilities.

In an implementation where the selection data includes a location mechanism that specifies an address to a media item not currently available for playback, after receiving such selection data, the computing system may then verify that the media item located at the address is playable at the media playback system. If the computing system determines that the media item is not playable, the computing system may discard that media item and may send data back to the computing device from which the selection data originated indicating that the media item is not playable. Other possibilities also exist.

d. Populating Playback Queue

At block 908, the method 900 may involve populating by the computing system the playback queue based on the one or more media item selections indicated by the received selection data. That is, the computing system (e.g., the media system server 130) may create or modify the playback queue by adding, removing, and/or re-ordering one or more media items based on the selections.

Populating the playback queue may involve the computing system placing the media item corresponding to the selection at the bottom or the top of the playback queue as the computing system receives the selections. Alternatively, populating the playback queue may involve the computing system placing the media item corresponding to the selection at a random spot within the playback queue. Further, populating the playback queue may involve the computing system moving a media item up or down in the playback queue order based on vote data.

In an implementation where the playback queue includes a mood setting, populating the playback queue may involve the computing system automatically placing the media item corresponding to the selection at a spot within the playback queue based on the mood setting and one or more attributes of the media item and/or the underlying content of the media item. For instance, continuing from the above example where the playback queue has a transitioning mood setting of "dance party" to "slow romantic" to "lights on . . . time to go home", the computing system might place a media item with a slow tempo in the portion of the playback queue that corresponds to the "slow romantic" mood setting. On the other hand, if the media item has a title such as "Closing Time", the computing system might place the media item in the portion of the playback queue that corresponds to the "lights on . . . time to go home" mood setting. Other examples are certainly possible. In other such implementations, the computing system might order the selections based on a e. Preventing Future Selections At block 910, the method 900 may optionally or additionally involve, responsive to the expiration of a predefined amount of time, preventing by the computing system any future media item selections. That is, in certain embodiments where the electronic invitations include a time element, the computing system may no longer allow invitation recipients to add media items to the playback queue after the time element expires. The time element may be the same as or similar to the time element described above with reference to block 802 of FIG. 8.

In example embodiments, after preventing any future media item selections, recipients may still be able to view the playback queue, and in some embodiments, recipients may still be able to vote on moving a particular media item up or down in the playlist order. Other examples are also possible.

f. Providing Media Item

At block 912, the method 900 may optionally or additionally involve providing a media item to the media playback system for playback. In example embodiments, providing the media item to the media playback system for playback may involve the media system server 130 sending the media item or a pointer (or other location mechanism) for the underlying content of the media item to the media playback system 110.

In certain implementations, the method 900 may optionally or additionally involve providing by the computing system a playlist that includes information that identifies the current media items in the playback queue. The computing device may provide the playlist to one or more of the computing devices 120-126 and/or a controller device of the media playback system 110. FIG. 10C may depict an example of a playlist provided by the computing system when output by a web interface on a remote computing device. Other examples are also possible. The computing system may provide the playlist before the event, during the event while the media playback system is playing media items, and/or after the event.

In some implementations, the method 900 may optionally or additionally involve providing by the computing system annotation data that indicates annotation information that is associated with a particular media item identified in the playlist. The annotation data may include message data and/or image data that indicates a message or image, respectively, associated with a particular media item. The computing system may provide the annotation information (e.g., a remote computing device may display the annotation information via a graphical display) before the event, during the event while the corresponding media item is played, and/or after the event.

Figure 10D:
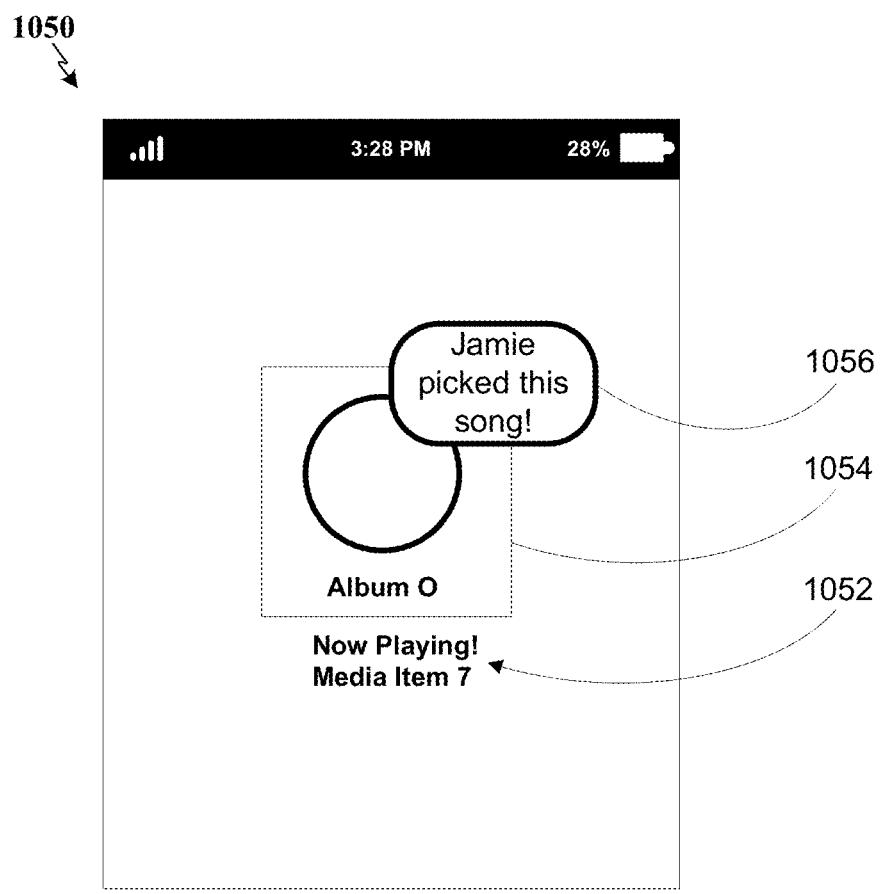

FIG. 10D depicts an example graphical display 1050 displaying an example web interface that includes annotation data. As shown, the web interface may display the current media item playing 1052, an album art associated with the media item 1054, and annotation data in the form of a message 1056. It should be understood that the graphical display 1050 is but one example of a display of annotation data and should not be construed as limiting.

IX. Conclusion

The descriptions above disclose various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components can be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

As provided in the embodiments discussed above, the present application may allow for remotely creating a playback queue of a media playback system by remote computing devices in communication with the media playback system via a WAN. In one aspect, a method is provided. The method involves receiving by a computing device an electronic invitation to add at least one media item to a playback queue of a media playback system, where the electronic invitation comprises a link to access information identifying a set of media items available for playback by the media playback system, and where the computing device and the media playback system are communicatively coupled via at least a WAN. The method further involves causing by the computing device a graphical display to display the information identifying the set of media items available for playback by the media playback system. The method further involves sending by the computing device selection data that indicates a selection of a particular media item from the set of media items to be added to the playback queue of the media playback system.

In another aspect, a non-transitory computer readable medium is provided. The non-transitory computer readable having instructions stored thereon that are executable by at least one processor. The instructions include instructions for receiving by a computing device an electronic invitation to add at least one media item to a playback queue of a media playback system, where the electronic invitation comprises a link to access information identifying a set of media items available for playback by the media playback system, and where the computing device and the media playback system are communicatively coupled via at least a WAN. The instructions further include instructions for causing by the computing device a graphical display to display the information identifying the set of media items available for playback by the media playback system. The instructions further include instructions for sending by the computing device selection data that indicates a selection of a particular media item from the set of media items to be added to the playback queue of the media playback system.

In one other aspect, a computing device is provided. The computing device includes a graphical display, a network interface, a non-transitory computer readable medium, and program instructions stored on the non-transitory computer readable medium. The program instructions are executable by at least one processor to cause the computing device to receive an electronic invitation to add at least one media item to a playback queue of a media playback system, where the electronic invitation comprises a link to access information identifying a set of media items available for playback by the media playback system, and where the computing device and the media playback system are communicatively coupled via at least a WAN. The program instructions are executable by the at least one processor to further cause the computing device to cause the graphical display to display the information identifying the set of media items available for playback by the media playback system. The program instructions are executable by the at least one processor to further cause the computing device to send selection data that indicates a selection of a particular media item from the set of media items to be added to the playback queue of the media playback system.

In another aspect, a method is provided. The method involves providing, by a computing system that is communicatively coupled to a media playback system via a WAN, a plurality of electronic invitations to a plurality of respective remote computing devices to add at least one media item to a playback queue of the media playback system, where each of the plurality of electronic invitations comprises a link to access information identifying one or more media items available for playback by the media playback system. The method further involves receiving by the computing system selection data that indicates one or more media item selections associated with one or more of the plurality of electronic invitations. The method further involves populating by the computing system the playback queue based on the one or more media item selections indicated by the received selection data.

In an additional aspect, a non-transitory computer readable medium is provided. The non-transitory computer readable having instructions stored thereon that are executable by at least one processor. The instructions include instructions for providing, by a computing system that is communicatively coupled to a media playback system via a WAN, a plurality of electronic invitations to a plurality of respective remote computing devices to add at least one media item to a playback queue of the media playback system, where each of the plurality of electronic invitations comprises a link to access information identifying one or more media items available for playback by the media playback system. The instructions further include instructions for receiving by the computing system selection data that indicates one or more media item selections associated with one or more of the plurality of electronic invitations. The instructions further include instructions for populating by the computing system the playback queue based on the one or more media item selections indicated by the received selection data.

In a further aspect, a computing system is provided. The computing device includes a network interface, a non-transitory computer readable medium, and program instructions stored on the non-transitory computer readable medium. The network interface communicatively couples the computing system to a media playback system via a WAN. The program instructions are executable by at least one processor to cause the computing system to provide a plurality of electronic invitations to a plurality of respective remote computing devices to add at least one media item to a playback queue of the media playback system, where each of the plurality of electronic invitations comprises a link to access information identifying one or more media items available for playback by the media playback system. The program instructions are executable by the at least one processor to further cause the computing device to receive selection data that indicates one or more media item selections associated with one or more of the plurality of electronic invitations. The program instructions are executable by the at least one processor to further cause the computing device to populate the playback queue based on the one or more media item selections indicated by the received selection data.

Additionally, references herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

We claim:

1. A cloud computing system comprising one or more cloud servers, the one or more cloud servers comprising:
a network interface;
one or more processors; and
data storage having stored therein instructions executable by the one or more processors to cause the cloud computing system to perform operations comprising:
receiving, via the network interface from a first mobile device over a wide area network, one or more messages representing an instruction to create a playlist for an event, wherein the first mobile device comprises a display;
in response to receiving the one or more messages representing the instruction to create a playlist for an event, creating the playlist in the data storage;
sending, to multiple second mobile devices via the network interface over the wide area network, one or more respective invitations to the event, wherein each invitation indicates: (i) a future time and date for the event and (ii) a link to a web interface, the web interface including user interface controls to add audio tracks from a media library of a streaming media service to the playlist for the event, wherein each second mobile device of the multiple second mobile devices comprises a display;
receiving, via the network interface before the event, respective sets of input data, each set of input data indicating one or more audio tracks selected via the web interface on a respective second mobile device of the multiple second mobile devices;
in response to receiving each set of input data indicating one or more respective audio tracks selected via the web interface, adding the one or more respective audio tracks selected via the web interface to the playlist; and
during the event, causing, via the network interface, the playlist to be queued in a queue of a media playback system for playback by one or more playback devices of the media playback system, wherein each playback device of the one or more playback devices (i) excludes a display and (ii) comprise a respective amplifier to drive one or more speakers.

2. The cloud computing system of claim 1, wherein the media playback system comprises multiple playback devices configured to play back the queue in synchrony in a party mode, wherein causing the playlist to be queued in the queue of the media playback system comprises causing the playlist to be queued in a local queue stored on at least one of the multiple playback devices for playback in synchrony by the multiple playback devices during the event, and wherein the multiple playback devices are interconnected via a local area network in a given household.

3. The cloud computing system of claim 1, wherein the web interface is hosted by the one or more cloud servers, and wherein the operations further comprise:
during the event, updating the web interface to include (i) an indication of the queue of the media playback system and (ii) an indication of the currently playing audio track of the queue.

4. The cloud computing system of claim 1, wherein the web interface is hosted by the one or more cloud servers, and wherein the operations further comprise:
during the event, updating the web interface to include controls to modify the queue of the media playback system.

5. The cloud computing system of claim 1, wherein the one or more messages representing the instruction to create a playlist for an event comprise a mood for the event; and wherein the operations further comprise:
in response to receiving each set of input data indicating one or more respective audio tracks selected via the web interface, filtering audio tracks having attributes that are inconsistent with the mood for the event from the playlist.

6. The cloud computing system of claim 1, wherein the operations further comprise:
before sending the invitations to the event, receiving, from the first mobile device, input data indicating one or more initial audio tracks selected via the web interface; and
in response to receiving the input data indicating one or more initial audio tracks selected via the web interface, adding the one or more initial audio tracks selected via the web interface to the playlist.

7. The cloud computing system of claim 6, wherein the web interface is hosted by the one or more cloud servers, and wherein the operations further comprise:
after adding the one or more initial audio tracks selected via the web interface to the playlist, updating the web interface to include an indication of the playlist, the playlist including at least the one or more initial audio tracks.

8. The cloud computing system of claim 1, wherein the media library of the streaming media service is hosted by the one or more cloud servers, and wherein the operations further comprise:
   during the event, streaming audio tracks queued in the queue of the media playback system to at least one playback device of the one or more playback devices for playback by the one or more playback devices.

9. The cloud computing system of claim 1, wherein the web interface is hosted by the one or more cloud servers, and wherein the operations further comprise:
   receiving, from a given second mobile device, input data indicating the selection of the link to the web interface; and
   in response to receiving input data indicating the selection of the link to the web interface, causing the given second mobile device to display the web interface, the web interface including (1) user interface controls to search a media library of a streaming media service for audio tracks to add to the playlist for the event and (2) user interface controls to browse a media library of a streaming media service for audio tracks.

10. A method comprising:
   receiving, via a network interface of a cloud computing system from a first mobile device over a wide area network, one or more messages representing an instruction to create a playlist for an event, wherein the first mobile device comprises a display, wherein the cloud computing system comprises one or more cloud servers;
   in response to receiving the one or more messages representing the instruction to create a playlist for an event, creating, via the cloud computing system, the playlist in data storage;
   sending, to multiple second mobile devices via the network interface of the cloud computing system over the wide area network, one or more respective invitations to the event, wherein each invitation indicates: (i) a future time and date for the event and (ii) a link to a web interface, the web interface including user interface controls to add audio tracks from a media library of a streaming media service to the playlist for the event, wherein each second mobile device of the multiple second mobile devices comprises a display;
   receiving, via the network interface of the cloud computing system before the event, respective sets of input data, each set of input data indicating one or more audio tracks selected via the web interface on a respective second mobile device of the multiple second mobile devices;
   in response to receiving each set of input data indicating one or more respective audio tracks selected via the web interface, adding, via the cloud computing system, the one or more respective audio tracks selected via the web interface to the playlist; and
   during the event, causing, via the network interface of the cloud computing system, the playlist to be queued in a queue of a media playback system for playback by one or more playback devices of the media playback system, wherein each playback device of the one or more playback devices (i) excludes a display and (ii) comprise a respective amplifier to drive one or more speakers.

11. The method of claim 10, wherein the media playback system comprises multiple playback devices configured to play back the queue in synchrony in a party mode, wherein causing the playlist to be queued in the queue of the media playback system comprises causing the playlist to be queued in a local queue stored on at least one of the multiple playback devices for playback in synchrony by the multiple playback devices during the event, and wherein the multiple playback devices are interconnected via a local area network in a given household.

12. The method of claim 10, wherein the web interface is hosted by the one or more cloud servers, and wherein the method further comprises:
   during the event, updating the web interface to include (i) an indication of the queue of the media playback system and (ii) an indication of the currently playing audio track of the queue.

13. The method of claim 10, wherein the web interface is hosted by the one or more cloud servers, and wherein the method further comprises:
   during the event, updating the web interface to include controls to modify the queue of the media playback system.

14. The method of claim 10, wherein the one or more messages representing the instruction to create a playlist for an event comprise a mood for the event; and wherein the method further comprises:
   in response to receiving each set of input data indicating one or more respective audio tracks selected via the web interface, filtering audio tracks having attributes that are inconsistent with the mood for the event from the playlist.

15. The method of claim 10, further comprising:
   before sending the invitations to the event, receiving, from the first mobile device, input data indicating one or more initial audio tracks selected via the web interface; and
   in response to receiving the input data indicating one or more initial audio tracks selected via the web interface, adding the one or more initial audio tracks selected via the web interface to the playlist.

16. The method of claim 15, wherein the web interface is hosted by the one or more cloud servers, and wherein the method further comprises:
   after adding the one or more initial audio tracks selected via the web interface to the playlist, updating the web interface to include an indication of the playlist, the playlist including at least the one or more initial audio tracks.

17. The method of claim 10, wherein the media library of the streaming media service is hosted by the one or more cloud servers, and wherein the method further comprises:
   during the event, streaming audio tracks queued in the queue of the media playback system to at least one playback device of the one or more playback devices for playback by the one or more playback devices.

18. The method of claim 10, wherein the web interface is hosted by the one or more cloud servers, and wherein the method further comprises:
   receiving, from a given second mobile device, input data indicating the selection of the link to the web interface; and
   in response to receiving input data indicating the selection of the link to the web interface, causing the given second mobile device to display the web interface, the web interface including (1) user interface controls to search a media library of a streaming media service for audio tracks to add to the playlist for the event and (2) user interface controls to browse a media library of a streaming media service for audio tracks.

19. A tangible, non-transitory computer-readable media having stored therein instructions executable by one or more processors to cause a cloud computing system to perform operations comprising:

receiving, via a network interface from a first mobile device over a wide area network, one or more messages representing an instruction to create a playlist for an event, wherein the first mobile device comprises a display;

in response to receiving the one or more messages representing the instruction to create a playlist for an event, creating the playlist in data storage;

sending, to multiple second mobile devices via the network interface over the wide area network, one or more respective invitations to the event, wherein each invitation indicates: (i) a future time and date for the event and (ii) a link to a web interface, the web interface including user interface controls to add audio tracks from a media library of a streaming media service to the playlist for the event, wherein each second mobile device of the multiple second mobile devices comprises a display;

receiving, via the network interface before the event, respective sets of input data, each set of input data indicating one or more audio tracks selected via the web interface on a respective second mobile device of the multiple second mobile devices;

in response to receiving each set of input data indicating one or more respective audio tracks selected via the web interface, adding the one or more respective audio tracks selected via the web interface to the playlist; and during the event, causing, via the network interface, the playlist to be queued in a queue of a media playback system for playback by one or more playback devices of the media playback system, wherein each playback device of the one or more playback devices (i) excludes a display and (ii) comprise a respective amplifier to drive one or more speakers, and wherein the one or more playback devices are connected via a local area network.

20. The tangible, non-transitory computer-readable media of claim 19, wherein the web interface is hosted by one or more cloud servers of the cloud computing system, and wherein the operations further comprise:

receiving, from a given second mobile device, input data indicating the selection of the link to the web interface; and in response to receiving input data indicating the selection of the link to the web interface, causing the given second mobile device to display the web interface, the web interface including (1) user interface controls to search a media library of a streaming media service for audio tracks to add to the playlist for the event and (2) user interface controls to browse a media library of a streaming media service for audio tracks.

* * * * *